United States Patent
Akbari et al.

(10) Patent No.: US 11,773,777 B2
(45) Date of Patent: Oct. 3, 2023

(54) ZERO-EMISSION JET ENGINE EMPLOYING A DUAL-FUEL MIX OF AMMONIA AND HYDROGEN USING A WAVE

(71) Applicant: New Wave Hydrogen, Inc., Calgary (CA)

(72) Inventors: Pejman Akbari, Pasadena, CA (US); Stefan Tuchler, Bath (GB)

(73) Assignee: New Wave Hydrogen, Inc.

( * ) Notice: Subject to any disclaimer, the term of this patent is extended or adjusted under 35 U.S.C. 154(b) by 0 days.

(21) Appl. No.: 17/545,771

(22) Filed: Dec. 8, 2021

(65) Prior Publication Data

US 2022/0195919 A1 Jun. 23, 2022

Related U.S. Application Data

(60) Provisional application No. 63/193,407, filed on May 26, 2021, provisional application No. 63/193,400, filed on May 26, 2021, provisional application No. 63/127,614, filed on Dec. 18, 2020.

(51) Int. Cl.
*F02C 3/30* (2006.01)
*F02C 7/224* (2006.01)
*F23R 3/36* (2006.01)

(52) U.S. Cl.
CPC ............... *F02C 3/30* (2013.01); *F02C 7/224* (2013.01); *F23R 3/36* (2013.01); *F05D 2220/323* (2013.01); *F05D 2240/35* (2013.01)

(58) Field of Classification Search
None
See application file for complete search history.

(56) References Cited

U.S. PATENT DOCUMENTS

| | | | |
|---|---|---|---|
| 2,832,665 A | 4/1958 | Hertzberg et al. |
| 2,832,666 A | 4/1958 | Hertzberg et al. |
| 2,902,337 A | 9/1959 | Glick et al. |
| 2,942,413 A | 6/1960 | Corbett |
| 2,987,873 A | 6/1961 | Fox |
| 3,235,341 A | 2/1966 | Hansel |

(Continued)

FOREIGN PATENT DOCUMENTS

| | | |
|---|---|---|
| CA | 2930838 | 5/2015 |
| WO | WO2016001476 | 1/2016 |

(Continued)

OTHER PUBLICATIONS

A.T. Mattick et al., "Shock-Controlled Chemical Processing," Proceedings of the 19th Int'l Symposium on Shock Waves, Marseille, France (Jul. 1993).

(Continued)

*Primary Examiner* — Ehud Gartenberg
*Assistant Examiner* — Jacek Lisowski
(74) *Attorney, Agent, or Firm* — Davidson Berquist Jackson & Gowdey LLP

(57) ABSTRACT

An improved power generation system for aircraft and methods of its operation are provided, wherein the system combines a wave reformer providing a contiguous fuel supply to a jet engine, and use of ammonia as the fuel source from which hydrogen and/or a duel supply of ammonia and hydrogen will be supplied to aircraft jet engines leading to a higher thermal efficiency than existing engines with low to no direct emission footprint.

14 Claims, 22 Drawing Sheets

(56) References Cited

U.S. PATENT DOCUMENTS

| | | | |
|---|---|---|---|
| 3,254,960 | A | 6/1966 | Hansel |
| 3,262,757 | A | 7/1966 | Bodmer |
| 3,272,598 | A | 9/1966 | Hansel |
| 3,307,917 | A | 3/1967 | Hansel et al. |
| 3,307,918 | A | 3/1967 | Bodmer et al. |
| 3,355,256 | A | 11/1967 | Hansel |
| 3,503,713 | A | 3/1970 | Hansel |
| 3,998,711 | A | 12/1976 | Hertzberg et al. |
| 4,160,813 | A | 7/1979 | Markel |
| 5,125,793 | A | 6/1992 | MacArthur |
| 5,300,216 | A | 4/1994 | Hertzberg et al. |
| 7,752,848 | B2 | 7/2010 | Balan et al. |
| 7,802,434 | B2 | 9/2010 | Vartharajan et al. |
| 9,365,775 | B1 | 6/2016 | La Crosse |
| 10,195,574 | B2 | 2/2019 | Bedard et al. |
| 10,384,180 | B2 | 8/2019 | Knowlen et al. |
| 2005/0072152 | A1 | 4/2005 | Suzuki et al. |
| 2009/0133400 | A1 | 5/2009 | Callas |
| 2010/0249468 | A1 | 9/2010 | Perkins |
| 2011/0060178 | A1 | 3/2011 | Nafis et al. |
| 2012/0047870 | A1* | 3/2012 | Kasuga ............... F02C 3/28 60/39.462 |
| 2013/0048486 | A1 | 3/2013 | Castillo et al. |
| 2013/0192321 | A1 | 8/2013 | Cheily |
| 2014/0243569 | A1 | 8/2014 | Seppala et al. |
| 2014/0328749 | A1 | 11/2014 | Hammel et al. |
| 2018/0215615 | A1 | 8/2018 | Kielb |
| 2018/0355794 | A1* | 12/2018 | Bulat ................ F02C 6/003 |
| 2020/0032712 | A1* | 1/2020 | Ito ..................... F02C 3/22 |
| 2021/0348557 | A1 | 11/2021 | Akbari et al. |
| 2022/0162989 | A1* | 5/2022 | Cocks ................ F02C 7/224 |

FOREIGN PATENT DOCUMENTS

| | | |
|---|---|---|
| WO | WO2018144595 | 8/2018 |
| WO | WO 2020/118417 | 6/2020 |

OTHER PUBLICATIONS

L. Nill et al., "Design of a Supersonic Steam Tunnel for Use As a Shock Wave Reactor," AIAA 95-0016, 33rd Aerospace Sciences Meeting and Exhibit, Reno, NV (Jan. 1995).

Robert K. Masse, "Fluid Dynamics of the Shock Wave Reactor," Ph.D Thesis, Univ. of Washington, (2000).

C. Knowlen et al., "Petrochemical Pyrolysis With Shock Waves," AIAA 95-0402, 33rd Aerospace Sciences Meeting and Exhibit, Reno, NV (Jan. 1995).

A.T. Mattick et al., "Pyrolysis of Hydrocarbons Using a Shock Wave Reactor," Paper 3800, 21st Symposium on Shock Waves, Great Keppel Island, Australia (Jul. 1997).

PCT/IB2021/000305—ISR mailed Aug. 25, 2021.

PCT/IB2021/000305—Written Opinion dated Aug. 25, 2021.

PCT/CA2021/051789—ISR mailed Mar. 8, 2022.

PCT/CA2021/051789—Written Opinion dated Mar. 8, 2022.

Muradov, Thermocatalytic CO2-Free Production of Hydrogen From Hydrocarbon Fuels, Proceedings of the 2000 Hydrogen Program review, NREL/CP-50-28890 (2000).

Carpenter, J.E., et al., An Existing Facility for SCRAM-JET Testing—The Wave Superheater, AIAA Journal, pp. 1701-1702, 1967.

Kielb, R., et al., Wave Rotors for Continuous, Vitiate-Free, High-Enthalpy Test Gas Generation, ,ACENT Labgoratories LLC, Hampoton, VA, Dec. 29014.

Carpenter, J.E., et al., "Wave Superheated Hypersonic Tunnel," Semiannual Report No. AD-1345-W-7, Cornell Aeronautical Laboratory, Buffalo, NY 1962.

Fang, Z., et al., Production of Hydrogen from Renewable Resources,: 2015.

Muradov, N., "Low to Near-Zero CO2 Production of Hydrogen from Fossil Fuels: Status and perspectives," Int J Hydrogen Energy, 2017, vol. 42, No. 20, pp. 14058-14088.

Tuchler et al., Validation of a Numerical . . . with Curved Channels, J. of Eng. for Gas Turbines & Power, 2020, vol. 142, No. 2, pp. 021017.

Muradov, Thermocatalytic CO2-Free Production of Hydrogen From Hydrocarbon Fuels, Proceedings of the 2000 Hydrogen Program Review, NREL/CP-570-28890 (2000).

Randy Vander Wal and Mpila Makiesse Nkiawete, "Carbons as Catalysts in Thermo-Catalytic Hydrocarbon Decomposition: A Review," 6 J. Carbon Res. 23, doi:10.3390/c6020023.

Mondal, K. C., Chandran, S. R., "Evaluation of the Economic Impact of Hydrogen . . . Reforming of Methane Process," Int J Hydrogen Energy, 2014, vol. 39, No. 18, pp. 9670-9674.

Abanades, A., "Low Carbon Production of Hydrogen by Methane Decarbonization," Chapter 6 in Production of Hydrogen from Renewable Resources, 2015, Springer, pp. 149-177.

EP Appln. No. 18747576.9—Extended European Search Report dated Jan. 11, 2021.

Akbari, P. et al., Numerical Simulation and Design of a Combustion Wave Rotor for Deflagrative and Detonative Propagation, 42nd AIAA Joint Propulsion Conference, Jul. 2006.

Moshrefi, M. et al., Methane Conversion to Hydrogen and Carbon Black by DC-Spark Discharge, Plasma Chem Plasma Process (2012) pp. 1167-1168.

Akbari, P. et al., Review of Recent Developments in Wave Rotor Combustion Technology, Journal of Propulsion and Power, vol. 25, No. 4, Jul.-Aug. 2009 pp. 833-844.

Akbari, P., Nalim, M.R., and Müller, N., "A Review of Wave Rotor Technology and Its Applications," ASME Journal of Engineering for Gas . . . vol. 128, No. 4, pp. 788-785 (1996).

Wilson, J. and Paxson, D.E., "Wave Rotor Optimization for Gas Turbine Topping Cycles," Journal of Propulsion and Power, vol. 12, No. 4, pp. 778-785 (1996).

Jones, S.M. and Welch, G.E., "Performance Benefits for Wave Rotor Topped Gas Turbine Engines," ASME, 41st Turbo Expo '96, Birmingham, UK (Jun. 10-13, 1996).

Zehnder, G. et al "Comprex® Pressure-Wave Supercharging for Automotive Diesels . . . " SAE Technical Paper Series 840132, International Congress & Exposition, (Feb. 27-Mar. 2, 1984).

Akbari, P. et al., "Performance Enhancement of Microturbine Engines . . . " ASME Journal of Engineering for Gas Turbines and Power, vol. 128, No. 1, pp. 190-202 (2006).

Welch, G.E., Jones, S.M., and Paxson, D.E., "Wave Rotor-Enhanced Gas Turbine Engines," Journal of Engineering for Gas Turbines and Power, vol. 119, No. 2, pp. 469-477 (1997).

Snyder, P. et al., "Assessment of a Wave Rotor Topped Demonstrator Gas Turbine . . . " ASME Paper 96-GT-41, International Gas Turbine . . . Birmingham, UK (Jun. 10-13, 1996).

Toulson, E., Schock, H., and Attard, W., "A Review of Pre-Chamber Initiated Jet Ignition Combustion Systems," SAE Technical Paper 2010-01-2263 (2010).

J.L. Lauer et al., "Continuous Shock Wave Reactor For Chemical Production and Reaction Studies," 22 Chem. Eng. Sci. 209-215 (1967).

P.H. Rose, "Potential Applications of Wave Machinery to Energy and Chemical . . . ," Proceedings of the 12th Int'l Symposium of Shock Tubes and Waves, Jerusalem, Israel (1979).

E.L. Klosterman et al., "The Use of an Unsteady Wave Chemical Reactor . . . Fuel Production," Proceedings of the 12th Int'l Symposium of Shock Tubes and Waves . . . , Israel (1979).

W.H. Christiansen et al., "Wave Machinery for Chemical Processing and High-Efficiency . . . ," Proceedings of the 20th Int'l Symposium on Shock Waves, Pasadena, CA (Jul. 1995).

Jurrian van der Dussen et al., "Design of a Process to Manufacture Ethylene From Ethane By Means of a Shock Wave Reactor," Delft Univ. of Technology (Jun. 2, 2006).

Marco W.M. van Goethem et al., "Ideal Chemical Conversion Concept for the Industrial Production . . . ," 46 Ind. Eng. Chem. Res. 4045-4062 (2007) (published on Web Oct. 13, 2006).

Erdin Kocak, "Embedding of Shock Wave Reactor in Thermal Cracking Process for Ethylene," Delft Univ. of Technology, Dept. of Chemical Technology and Material Science (May 2007).

(56) References Cited

OTHER PUBLICATIONS

A. Hertzberg, "Nitrogen Fixation for Fertilizers by Gasdynamic Techniques," Proceedings of the 10th Int'l Symposium on Shock Tubes, Kyoto, Japan (1975).
Akbari, P. et al., "Shock Wave Heating: A Novel Method for Low-Cost Hydrogen Production," ASME 2021 International Mechanical Engineering Congress, Nov. 2021.
PCT/CA2022/050645, Notification of Transmittal of ISR & Written Opinion, dated Jul. 15, 2022.
PCT/CA2022/050645, International Search Report, dated Jul. 15, 2022.
PCT/CA2022/050645, Written Opinion of the ISA, dated Jul. 15, 2022.
Holmen, A., Olsvik, 0., and Rokstad, O. A., "Pyrolysis of Natural Gas: Chemistry and Process Concepts," Fuel Process. Technol., 1995, vol. 42, pp. 249-267.
Gyarmathy, G., "How Does the Comprex Pressure-Wave Supercharger Work?," SAE Paper 830234, 1983.
Mohammad Mahdi Moshrefi et al., "Methane Conversion to Hydrogen and Carbon Black by DC-Spark Discharge," Plasma Chemistry and Plasma Processing . . . , vol. 32, No. 6, Sep. 9, 2012.

\* cited by examiner

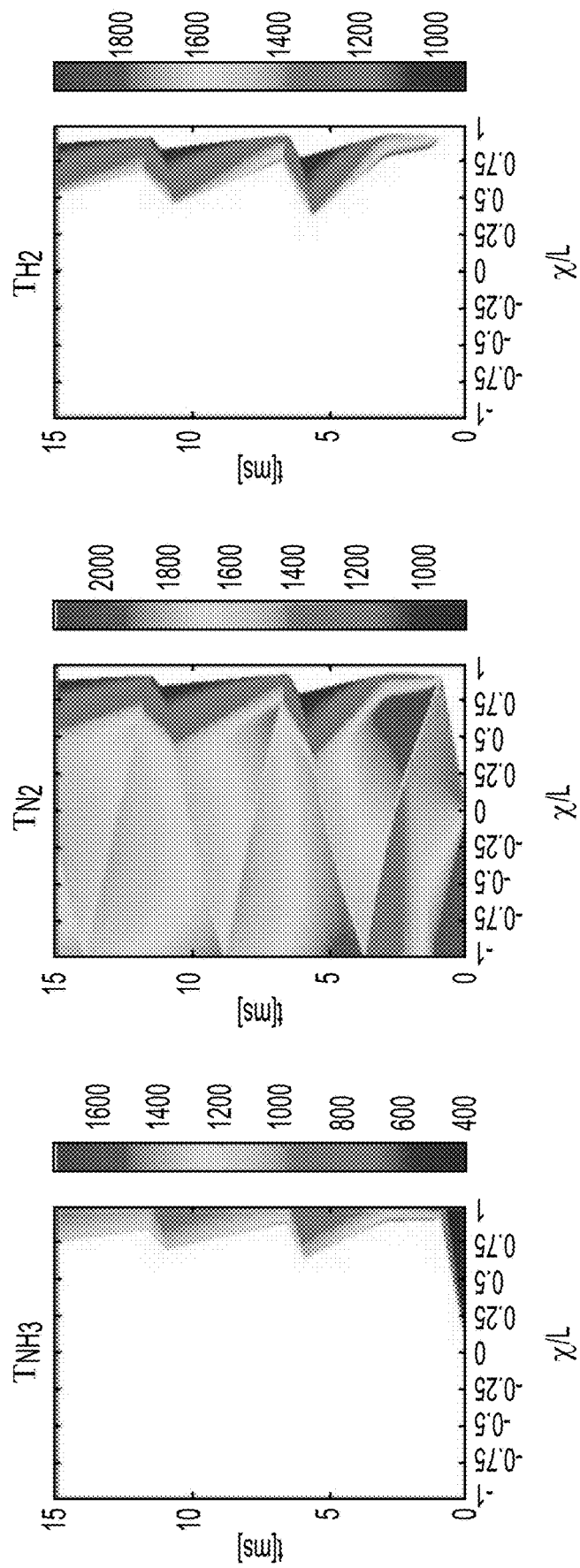
*FIG. 7A* *FIG. 7B* *FIG. 7C*

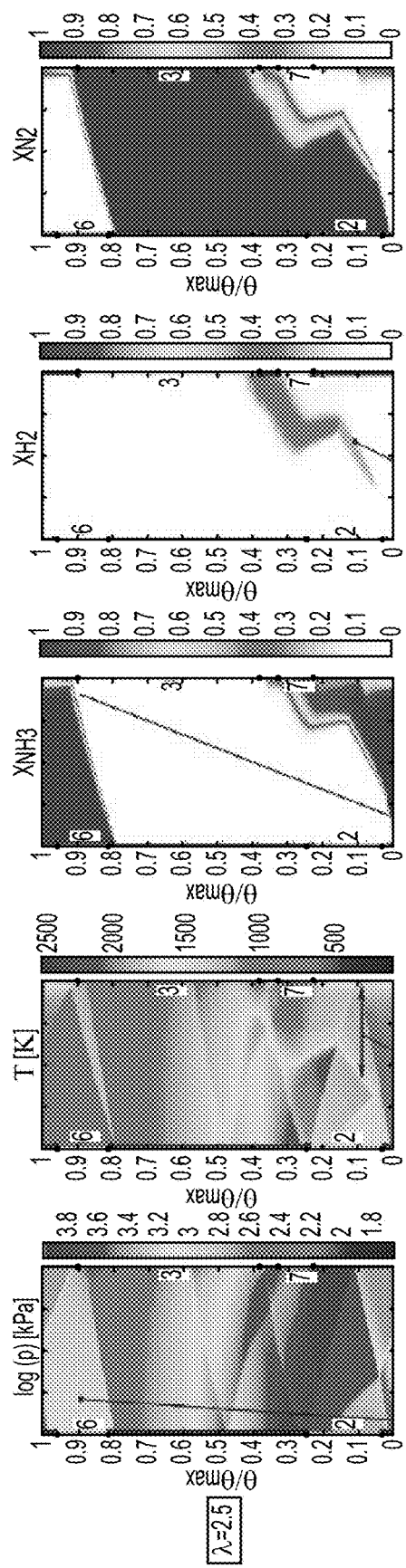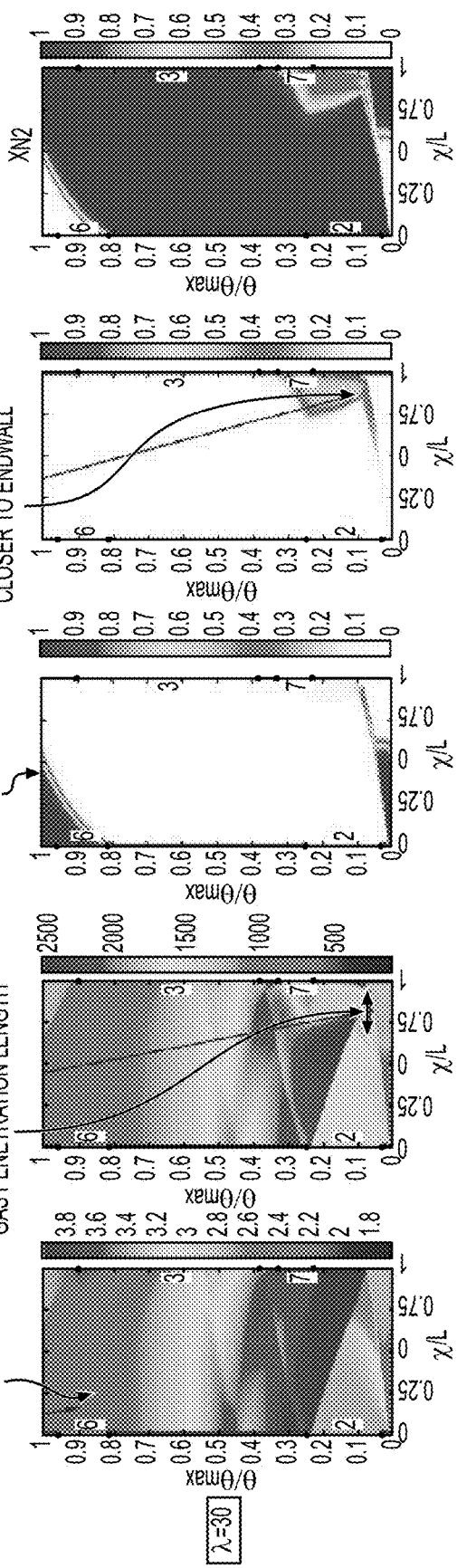
FIG. 18A  FIG. 18B  FIG. 18C  FIG. 18D  FIG. 18E
FIG. 18F  FIG. 18G  FIG. 18H  FIG. 18I  FIG. 18J TABLE 1: CALCULATED WAVE REFORMER PORT THERMODYNAMIC PROPERTIES ACCORDING TO THE STATE NUMBERING IN FIG.15

| $\lambda$ $\dot{m}_2/\dot{m}_6$ | $\dot{m}_2$ (kg/s) | $\dot{m}_6$ (kg/s) | $\dot{m}_3$ (kg/s) | $\dot{m}_7$ (kg/s) | BLEED % $\dot{m}_2/(\dot{m}_1+\dot{m}_7)$ | $T_2$(K) | $T_6$(K) | $T_3$(K) | $T_7$(K) | $P_2$ (kPa) | $P_6$ (kPa) | $P_3$ (kPa) | $P_7$ (kPa) |
|---|---|---|---|---|---|---|---|---|---|---|---|---|---|
| 5  | 108.6 | 21.7 | 102.5 | 27.8 | 8.84 | 1600.4 | 1028.7 | 1258.8 | 1459.6 | 2193.2 | 805.8 | 101.3 | 2026.5 |
| 10 | 114.7 | 11.5 | 99.2  | 26.9 | 9.35 | 1601.6 | 1043.1 | 1344.4 | 1591.7 | 2188.9 | 557.7 | 101.3 | 2026.5 |
| 15 | 117.0 | 7.8  | 96.2  | 28.7 | 9.52 | 1602.6 | 1049.2 | 1393.7 | 1632.6 | 2194.1 | 455.0 | 101.3 | 2026.5 |
| 20 | 118.3 | 5.9  | 95.5  | 28.7 | 9.63 | 1603.2 | 1052.7 | 1422.5 | 1664.4 | 2197.1 | 400.8 | 101.3 | 2026.5 |
| 25 | 119.2 | 4.8  | 95.7  | 28.3 | 9.70 | 1603.0 | 1054.9 | 1442.7 | 1688.8 | 2197.3 | 367.5 | 101.3 | 2026.5 |

FIG. 20

ZERO-EMISSION JET ENGINE EMPLOYING A DUAL-FUEL MIX OF AMMONIA AND HYDROGEN USING A WAVE

CROSS-REFERENCE TO RELATED APPLICATION

This application claims priority to: U.S. Provisional Application No. 63/127,614, filed Dec. 18, 2020; U.S. patent application Ser. No. 17/307,621 filed on May 4, 2021; U.S. Provisional Application No. 63/193,400, filed May 26, 2021; and U.S. Provisional Application No. 63/193,407, filed May 26, 2021; each of which is incorporated herein fully in their entirety by reference thereto.

BACKGROUND OF THE INVENTION

Field of the Invention

The present invention relates generally to aircraft engine power generation systems that include a wave reformer for continuously generating and providing a zero-carbon fuel blend of ammonia and hydrogen, for powering aircraft engines, thereby enhancing existing engine power and reducing emissions, and to methods of operating such systems. More specifically, the present invention involves continuously thermally cracking of ammonia by or via shock waves to produce a blend of ammonia-hydrogen as a 'carbon neutral' aviation fuel that can be fed directly to and used by aircraft engines to power flight, reducing global carbon dioxide emissions. The present invention is also based on wave rotor technology utilizing the energy contained in combustor burned gas to compress and heat ammonia up to temperatures at which high conversion rates can be achieved on short timescales. Then, the resulting produced ammonia-hydrogen fuel mixture is fed into the burner as reactant which leads to hydrogen, nitrogen, and water vapor as primary gas products. The shock-wave process has been modeled numerically using quasi-one-dimensional code that has been experimentally validated for non-reacting wave rotors. A single-reaction, global kinetic model was developed to approximate the $NH_3$ pyrolysis reaction chemistry across the temperature and pressure conditions of interest, thereby enabling the incorporation of chemistry in the numerical simulations. The computational results provide data used in the prediction of flow fields inside the channels of the wave reformer and at the inflow/outflow ports of the reactor. The data confirm production of a mixture of ammonia and hydrogen using energy harvested from the engine burner exhaust. This invention comprises a new application of the shock-wave reforming process as well as another step in the realization of employing ammonia as an aviation fuel without carbon content.

DESCRIPTION OF RELATED ART

Wave reformers that are suitable for use in the present invention have been disclosed in published U.S. Patent Application Publication US 2018/0215615 A1, entitled "Hydrocarbon wave reformer and Methods of Use," published Aug. 2, 2018, and assigned to Standing Wave Reformer LLC (now assigned to New Wave Hydrogen, Inc.); the entire disclosure of which is hereby incorporated by reference. A description may also be found on the website www.NewWaveH2.com.

A variety of other wave rotor devices that can be used in a wide range of applications have previously been disclosed. (See, Akbari, P., Nalim, M. R., and Müller, N., "A Review of Wave Rotor Technology and Its Applications" ASME Journal of Engineering for Gas Turbines and Power, Vol. 128, No. 4, pp. 717-735 (2006)). The essential feature of a wave rotor is an array of channels arranged around the axis of a cylindrical, rotating drum. A wave rotor has a cylindrical rotating drum that rotates between two stationary end plates, each of which has a few ports or manifolds, controlling the fluid flow through the channels. Through rotation, the channel ends are periodically exposed to differing port pressures, initiating compression, and expansion waves within the wave rotor channels. The number of ports and their positions vary for different applications. By carefully selecting their locations and widths to generate and utilize wave processes, a significant and efficient transfer of energy can be obtained between flows in the connected ducts. Thus, pressure is exchanged dynamically between fluids by utilizing unsteady pressure and expansion waves. Unlike a steady-flow turbomachine that either compresses or expands the fluid, the wave rotor accomplishes both compression and expansion within a single component. The gap between the end plates and the rotor is kept very small to minimize leakage, but without contact under all operating and thermal expansion conditions.

Wave rotors have been investigated as a topping unit to improve the performance of a gas turbine engine. (See, Wilson, J. and Paxson, D. E., "Wave Rotor Optimization for Gas Turbine Topping Cycles," Journal of Propulsion and Power, Vol. 12, No. 4, pp. 778-785 (1996); Jones, S. M. and Welch, G. E., "Performance Benefits for Wave Rotor Topped Gas Turbine Engines," ASME, 41st Turbo Expo '96, Birmingham, UK (Jun. 10-13, 1996)). The main interest of such a topping unit application is that the thermal efficiency of a gas turbine increases as cycle pressure ratio increases. In the most commonly used method for topping a gas turbine with a wave rotor, the pressure in the combustion chamber of the enhanced engine is increased by the compression ratio of the wave rotor, while the compressor is the same for the baseline engine and the wave-rotor-enhanced engine. This is very similar to how wave rotors are employed as a pressure wave supercharger for supercharging diesel engines. (See, Zehnder, G. and Mayer, A., "Comprex® Pressure-Wave Supercharging for Automotive Diesels—State-of-the-Art," SAE Technical Paper Series 840132, International Congress & Exposition, Detroit, Mich. (Feb. 27-Mar. 2, 1984)).

BACKGROUND

The evidence of environmental damage caused by consumption of carbon-based fossil fuels is overwhelming. The aviation sector is among important transportation segments that contribute to environmental emissions and deterioration. While the aviation industry primarily utilizes petroleum-based fuels, hydrogen and ammonia offer interesting pathways for achieving sustainable and green aviation. Both fuels have been extensively explored as alternative fuels in ground vehicles and gas turbine engines The potential of using hydrogen fuel for a jet engine as a long-term energy solution has received significant attention. As a clean fuel, combustion of hydrogen with air does not release any harmful, carbon-containing green-house gases contributing to global warming. Additionally, (liquid) hydrogen contains 2.8 times more energy than conventional aircraft kerosene fuel. Ammonia, as another zero-carbon fuel, offers an energy density even higher than compressed hydrogen. It can be easily stored in relatively low-pressure tanks (e.g. pressure of 8.8 atm at 21° C.). Ammonia is also a well-known hydrogen carrier, thus, producing hydrogen from ammonia is possible.

Even though these carbon-free fuels have the potential to replace hydrocarbon fuels, there are a number of barriers that must be overcome before such fuels can be commercially used for both transport and power applications. For instance, the use of hydrogen is compromised by the fact that the space required to store liquid hydrogen is 4 times the volume needed to store kerosene; due to its lower density. This introduces significant challenges associated with the design of fuel tanks for airborne applications. Meanwhile, high $NO_x$ emissions associated with ammonia oxidation, along with its low flame speed, have hindered the use of ammonia as a sustainable fuel in aviation. Results have shown positive power production, but this power production comes at a cost of high $NO_x$ emissions due to the N atom in ammonia molecules that is not present in conventional hydrocarbon fuels. The $NO_x$ emissions challenge for ammonia-fueled turbine engines has been recognized as one of the main limitations of this fuel. New findings show that addition of hydrogen can improve flame stability and reduce $NO_x$ emissions. In addition, co-combustion of ammonia and hydrogen has been shown to enhance the flame speed. These results encourage further tests and research for deployment of ammonia-based propulsion systems.

Here, a new pyrolysis apparatus and its method or operation is proposed that uses a wave-rotor reformer to generate and provide a zero-carbon fuel blend of ammonia and hydrogen on a continuous basis benefiting from both fuels and effectively reducing emissions. Although wave rotor technology has already been shown to enhance the performance of aircraft engines, this present invention illustrates a completely new application of wave rotors to continuously produce gaseous ammonia-hydrogen fuel blend that can be used for aviation or for power-generation applications. This invention describes how a wave-rotor reformer uses shock waves to compress preheated ammonia by direct utilization of the energy from hot, high-pressure combustion products. The shock-compression raises the ammonia temperature sufficiently high to achieve thermal decomposition and the partial cracking of ammonia into hydrogen, thereby resulting in a zero-carbon, ammonia-hydrogen fuel mixture for a burner of an engine, such as an aircraft jet engine.

New Wave Hydrogen, Inc. (New Wave $H_2$ or $NWH_2$) has recently introduced a rotary wave reformer using the wave rotor technology for methane-pyrolysis processing in the form of U.S. patent application Ser. No. 15/885,453, now U.S. Pat. No. 11,220,428. The goal is to achieve a rapid and homogeneous temperature amplification sufficient to thermally decompose (i.e. crack) hydrocarbons entering the rotor channels. The shock heating splits methane into hydrogen and solid carbon in the absence of oxygen, i.e., $CH_4 \rightarrow C+1.5\ H_2$. The main characteristic of this process is the absence of oxygen, which eliminates $CO_2$ and CO by-products. This is an important distinction relative to competing methods of methane pyrolysis, i.e. the gas is not heated using electrical or plasma powered sources, it is heated by the rapid compression wave cycle.

It is now envisioned to use the rotary wave reforming concept to compress and heat ammonia until it breaks apart into its constituent species (i.e., $NH_3 \rightarrow 0.5\ N_2+1.5\ H_2$). This is an endothermic reaction requiring 46 $KJ/mol_{NH3}$ which can be provided by a hot, high-pressure driver gas source. The wave reformer benefits from energy transfer in the shock wave and the use of the energy embodied in the burned gas. With regard to ammonia reforming onboard a wave reformer, the process is equivalent to ammonia thermal cracking using shock waves in a shock tube. Ammonia thermal decomposition using shock waves has been demonstrated in previous shock tube studies. As described in this invention, it is possible to thermally crack ammonia in a continuous basis in a wave reformer on timescales similar to those seen in a shock tube.

SUMMARY OF THE INVENTION

As an improvement over the prior art systems discussed above, the present invention includes an innovative method for in-flight pyrolysis of ammonia to produce a zero-carbon fuel blend of ammonia and hydrogen for jet engines is described. The basis of the innovation is the wave rotor technology that uses unsteady waves to exchange energy between two fluids in direct contact. The shock waves travel along channels arranged in an array around the circumference of the rotor. A wave reformer adopts a wave rotor to harnesses energy contained in the engine burner exhaust-gas to compress and heat gaseous ammonia until it partially decomposes and forms hydrogen and nitrogen. This process uses shock-wave heating to efficiently achieve the high temperatures required for ammonia cracking; it does not require any external heat source and instead utilizes a low percentage of the hot, high-pressure exhaust gas bled off from the burner. To investigate the potential of shock waves to heat up a gas to temperatures suciently high to initiate decomposition of ammonia, first a shock tube study was carried out and hydrogen formation was demonstrated in the driven section of the tube. Moving to a wave rotor configuration, modeled in conjunction with a selected baseline engine, it was found that hydrogen was also formed in the channels of the reformer through cracking of onboard ammonia as fuel.

In one aspect of the invention, the power generation system includes: a combustor or burner having one inlet to receive high-pressure fluid, another inlet to receive high-pressure fuel product, and an output for high-pressure burned gas, where the high-pressure fuel product is combusted; a wave reformer provided with ports with a first port receiving a pressurized, and preferably preheated, fuel source, such as a preheated hydrocarbon fuel, a second port that releases high-pressure fuel product to one of the inputs of the combustor (burner), a third port that receives high-pressure burned gas from the combustor (burner), and a fourth port that exhausts lower-pressure burned gas to the atmosphere or for perhaps other purposes, such as preheating the high-pressure fluid entering the rotor at the first port. The wave reformer is configured to cause decomposition of the pressurized, and preferably preheated, fuel source into a high-pressure fuel product including hydrogen, for use by a turbine operatively connected to the system for generating power.

In another aspect, the invention is to a method of generating power comprising, for example, supplying a high-pressure fuel product to a combustor (burner), then supplying a fuel source, such as a preferably preheated hydrocarbon fuel, to a wave reformer through a first inlet port of a wave reformer device to allow thermal decomposition of the preferably preheated fuel source into a high-pressure fuel product including hydrogen, which is then followed by injecting that high-pressure fuel product, including hydrogen exiting from the wave reformer, to a combustor to allow combustion, and then by directing a major portion of the high-pressure burned gas from the combustor to a turbine to allow for the generation of power, and a lesser portion thereof back to the wave reformer. In operation many of these steps occur simultaneously throughout the power generation process.

BRIEF DESCRIPTION OF THE DRAWINGS

FIGS. 7A-7C show an additional series of plots showing temperature range for $NH_3$ (left), $N_2$ (middle), and $H_2$ (right) in shock tube as functions of time;

FIGS. 18A-18J show a series of plots showing flow field comparison between two different inlet mass flow splits $\lambda$.;

FIG. 20 sets forth Table 1 that shows the mass flow rate, static pressure, and static temperature at the inlets and outlets of the wave reformer used in the present invention.

DETAILED DESCRIPTION OF THE INVENTION

Wave Reformer Description

The wave rotor is a direct energy exchange device that utilizes one-dimensional pressure wave action for the transfer of mechanical energy between two compressible fluid flows which are at different pressure levels.

The wave rotor typically consists of a cylindrical rotor with a number of long axial channels arrange uniformly around its periphery. The rotor spins between two stationary endplates through which the flow enters and exists. Each endplate has a number of ports to accommodate the incoming and outgoing fluids. Each of the rotating channels operates similar to an individual shock tube. The entry and exit endplates function as the valves and resemble the shock tube diaphragm rupture, initiating a series of unsteady compression and expansion waves in the channels as they periodically rotate past the inlet and exit ports and regions of closed endplates. To generate compression waves, the channels are exposed to a high-pressure port of a driver gas which enters the channels and compresses the gas within it. To generate expansion waves, the channels are exposed to a low-pressure port and the gas in the channels discharges. By using a large number of channels on the rotating drum, the pulsed process occurring in a single shock tube is translated to a continuous process. Therefore, the wave rotor can be considered the steady-flow, cyclical analogue of the pulsed shock tube. In a typical design, the channels are designed axially and arranged parallel to the drive shaft driven by a motor. In such a configuration, the only power input to the rotor is that necessary to overcome bearing friction. However, if the tubes are not axial (e.g. curved channels), net power can even be extracted from the rotor similar to that of a turbine in addition to the work exchange between the fluid streams.

Figure 1:
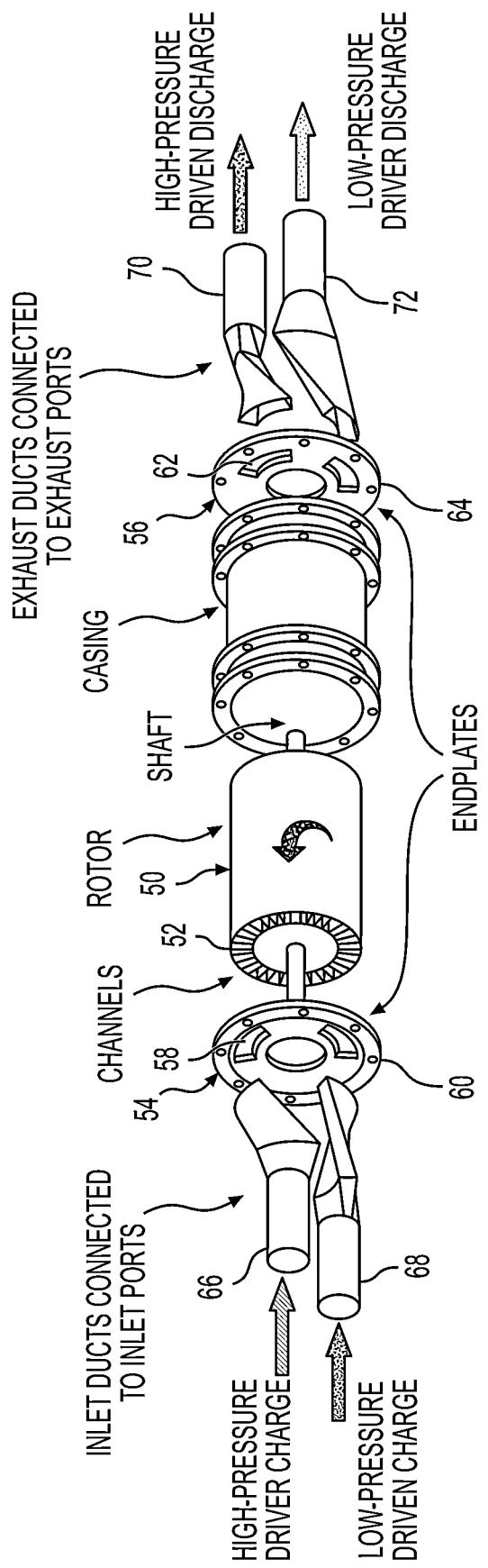
FIG. 1 is a schematic showing a prior art implementation of a conventional wave rotor.

A schematic of a typical wave rotor 50 is shown in FIG. 1. In the wave rotor 50, a high-pressure driver gas exchanges its energy with a low-pressure driven gas within the rotating channels of a drum known as the rotor. The wave rotor 50 includes a cylindrical rotor/drum 52 that includes an array of channels 52 arranged around the axis of the rotor 52. The cylindrical rotor 50 rotates between two stationary endplates 54 and 56 each of which has a few ports or manifolds that control the fluid flow through the channels. End plate 54 is shown with two ports 58 and 60 and end plate 56 includes ports 62 and 64. Between the rotor 50 and the interior faces of endplates 54 and 56 there is no contact, but to minimize leakage, the gap is kept very small, or the endplates might built with sealing material that contacts the rotor. Through rotation, the ends of channels 52 are periodically exposed to the ports located on the endplates 54 and 56 initiating compression and expansion waves within the wave rotor channels 52. At least one shock wave is generated in the channels when the high-pressure port opens during the rotational cycle, as described in the following. This transfers the driver gas energy to the driven gas.

The wave rotor configuration shown in FIG. 1 uses two inlet ports 66 and 68 and two outlet ports 70 and 72, and thus, it is referred to as a four-port wave rotor. The driven (low-pressure fluid) enters the rotor from an inlet port 68 at one end of the rotor 50 and after it is compressed it leaves at opposite end of the rotor as a high-pressure driven gas using an outlet port 70 (labeled "high-pressure driven gas."). A driver fluid (high-pressure fluid) enters via inlet port 66 and leaves at the opposite end of the rotor 50 as a low-pressure driver gas via outlet port 72. Thus, the rotor 50 experiences a through-flow pattern internally. The high-pressure driver fluid expanded by expansion waves leaves the rotor 50 at a pressure lower than that at which it came in. Thus, the energy gain in the low-pressure driven gas is countered by a corresponding energy loss in the burned driver gas. By carefully selecting port locations and their widths, significant and efficient transfer of energy can be obtained between flows in the connected ducts with minimum mixing between flows. The generated waves replace energy-exchange processes conventionally accomplished with compressors and turbines.

Figure 2:
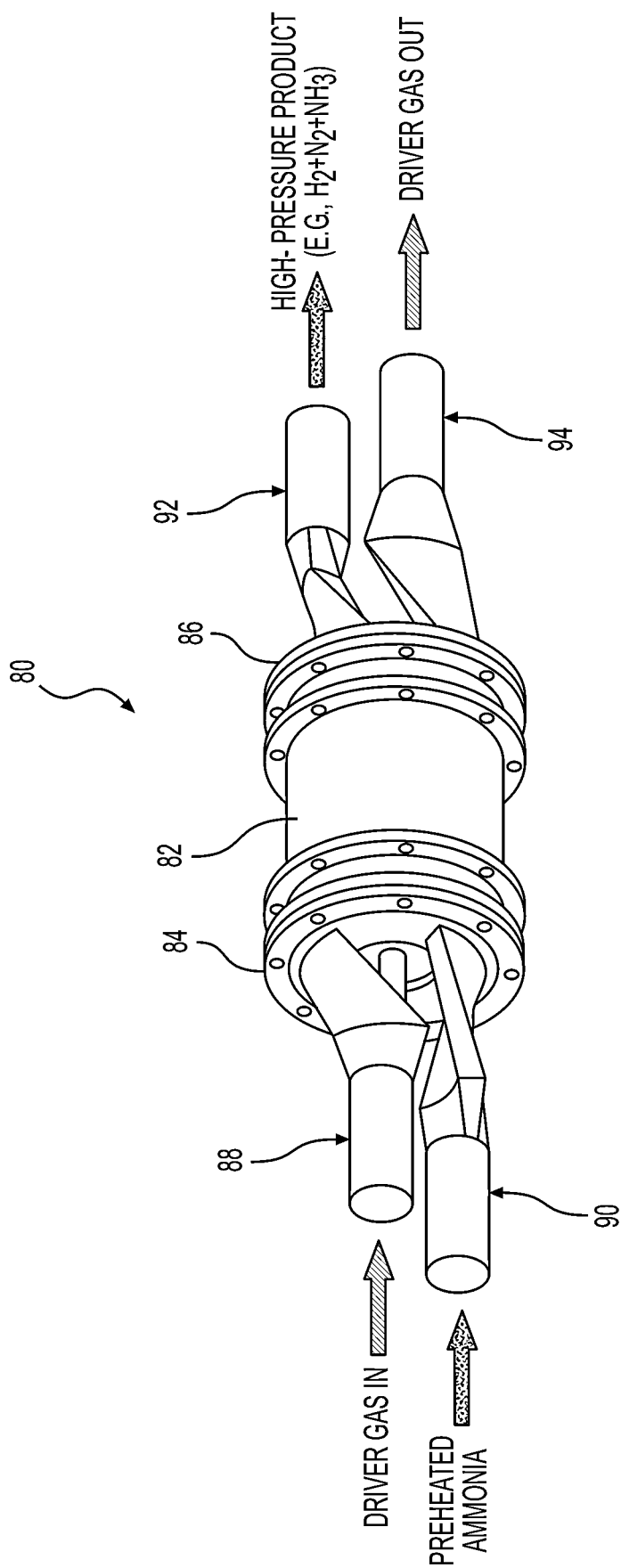
FIG. 2 depicts a prior art through-flow four-port wave rotor for a gas turbine application, which is now used for cracking ammonia.

FIG. 2 illustrates a wave rotor configuration using a four-port wave rotor architecture for ammonia pyrolysis. The wave reformer device 80 also includes a rotor 82 endplates 84 and 86, two inlet ports 88 and 90 and two outlet ports 92 and 94. Wave reformer 80 uses burned driver gas leaving a burner at a high pressure (driver gas) connected to the rotor by inlet port 88. This incoming high-pressure driver gas compresses the preheated ammonia (driven gas) entering the rotor channels from a secondary inlet port 90. Due to the pressure difference between the driver and driven gases, a shock wave is generated in the channels within rotor 82. This transfers the driver gas energy to the driven ammonia gas. Under appropriate conditions, the temperature rise from the supersonic shock wave compression heats up the driven ammonia gas to a temperature sufficient to thermally crack ammonia into hydrogen and nitrogen. The high-pressure products and expanded burned driver gas separately exit the rotor 82 from two exit ports, 92 and 94, respectively, as the labels demonstrate. The rotor channels are alternately exposed to relatively cooler driven gas at high frequencies; thus, the metal temperature of the rotor is expected to remain at near a mean temperature sufficiently lower than the burned gas temperature (post-combustion) gas temperature during the ammonia thermal decomposition.

In the four-port wave rotor shown in FIGS. 1 and 2, the inlet ports are located on one side of the rotor, and the outlet ports are located on the other. This is often known as a through-flow configuration. Alternatively, it is possible to design a reverse-flow device where each gas stream enters and leaves the channel from the same end. These two configurations may provide similar overall performance, but they differ substantially in their internal processes.

Figure 3:
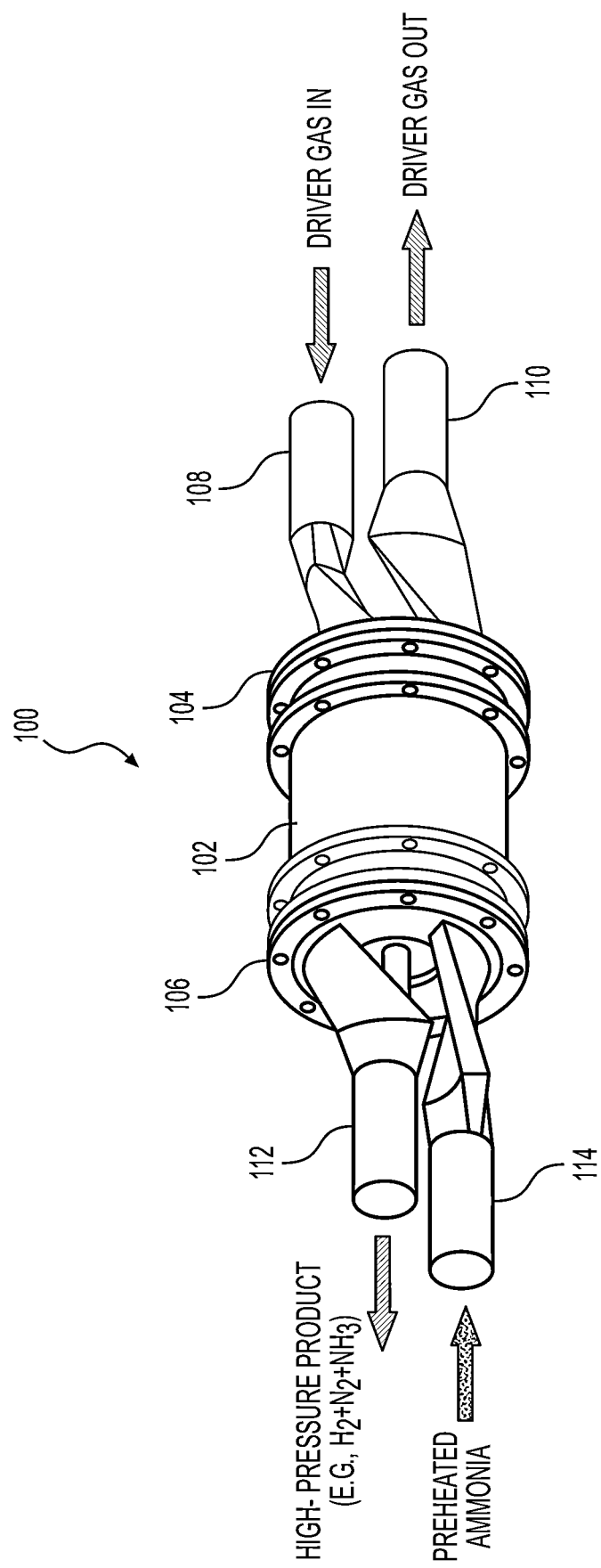
FIG. 3 shows a prior art reverse-flow four-port wave rotor, which is now used for cracking ammonia.

FIG. 3 shows a reverse-flow wave reformer. The reverse wave reformer device 80 in FIG. 3 includes a rotor 102 endplates 104 and 106, two inlet ports 108 and 112 and two outlet ports 110 and 114. On the left side, preheated ammonia enters rotor 102 via inlet port 114 and is discharged as a high-pressure product via outlet port 112 on the same left side. On the right side, a driver gas is supplied via inlet port 108 and is discharged on the same right side via outlet port 110. The cycle for this reverse flow wave reformer is discussed in greater detail subsequently.

Pyrolysis of Ammonia by Shock Waves

The combustion kinetics of ammonia has been the focus of many research activities, due to the high potential of ammonia as a fuel for internal combustion engines as well as gas turbines. Many studies on the combustion properties of ammonia-air or ammonia-oxygen mixtures utilizing shock heating in shock tubes have been reported, but less data are available about the decomposition of ammonia in the absence of air/oxygen, e.g. with no combustion. To verify formation of hydrogen through shock heating of ammonia, a numerical modeling was first conducted to simulate dissociation of ammonia in a conventional shock tube.

To investigate the influence of the driver gas initial temperature on shock heating, the one-dimensional Riemann or Sod shock-tube problem is considered. The problem represents an initial value problem (IVP) and is solved exactly assuming that the working medium behaves as an inviscid and calorically perfect gas.

Figure 4:
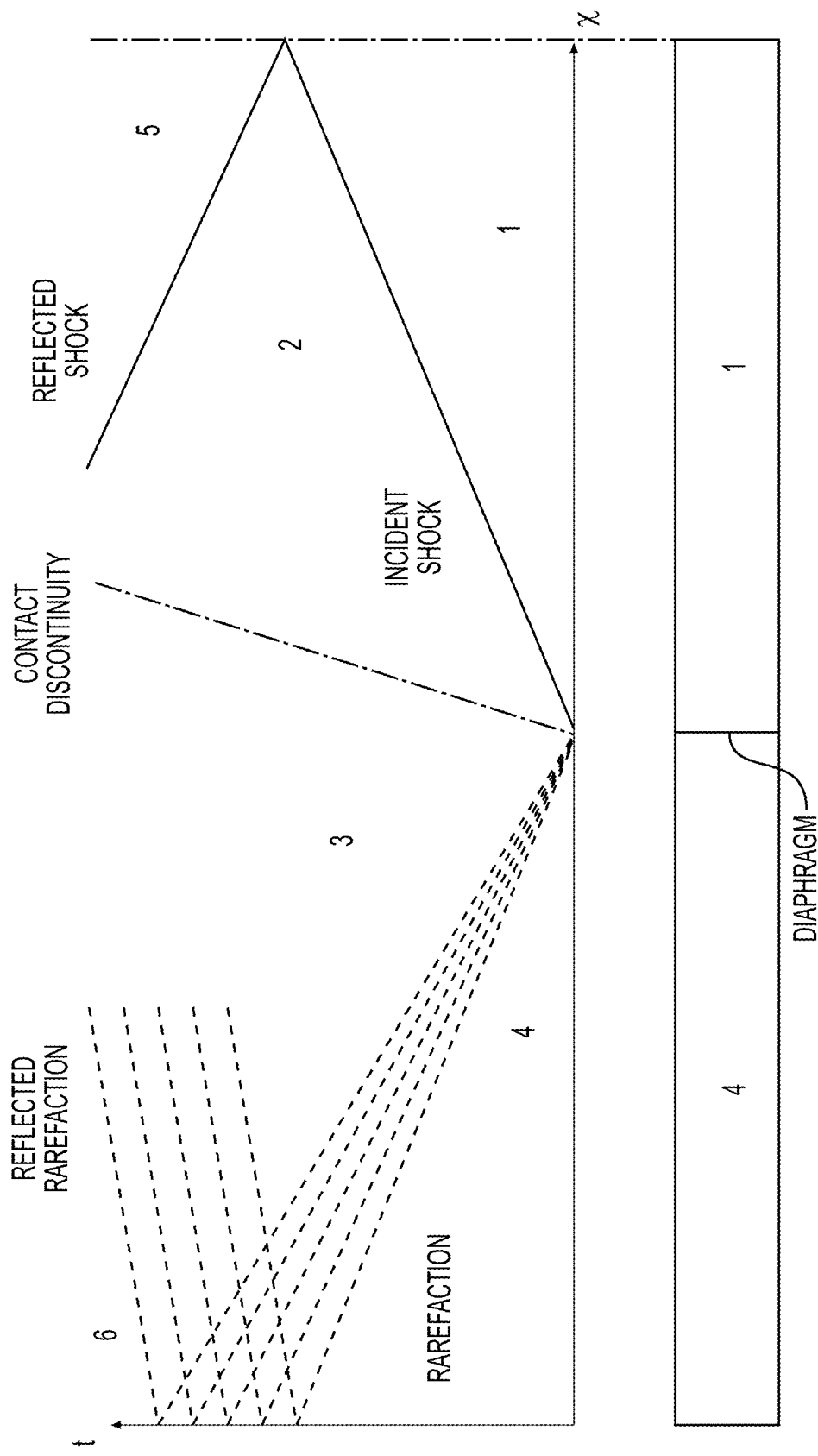
FIG. 4 shows a wave cycle in a shock tube.

FIG. 4, shows $NH_3$ at 1 atmosphere pressure and 400 K temperature which was considered in the driven section (State 1), and $N_2$ at 38 atm and 2000 K in the driver section (State 4) was introduced. Both driver and driven gas are assumed to be at rest at the start of the simulation. The simulation ran for 15 milliseconds and the shock tube length was chosen with 2 in with the diaphragm optionally located in the middle of it (i.e. at x=0 m). The rupture of the diaphragm generates a right-running incident shock wave followed by a contact discontinuity and a left-running expansion fan or rarefaction wave. The right-running incident shock wave changes $NH_3$ properties from State 1 to Sate 2. Meanwhile, the left-running expansion fan changes $N_2$ properties from State 4 to State 3. $NH_3$ properties behind the left-running reflected shock wave generated at the right wall are represented by State 5.

Figures 5A, 5B:
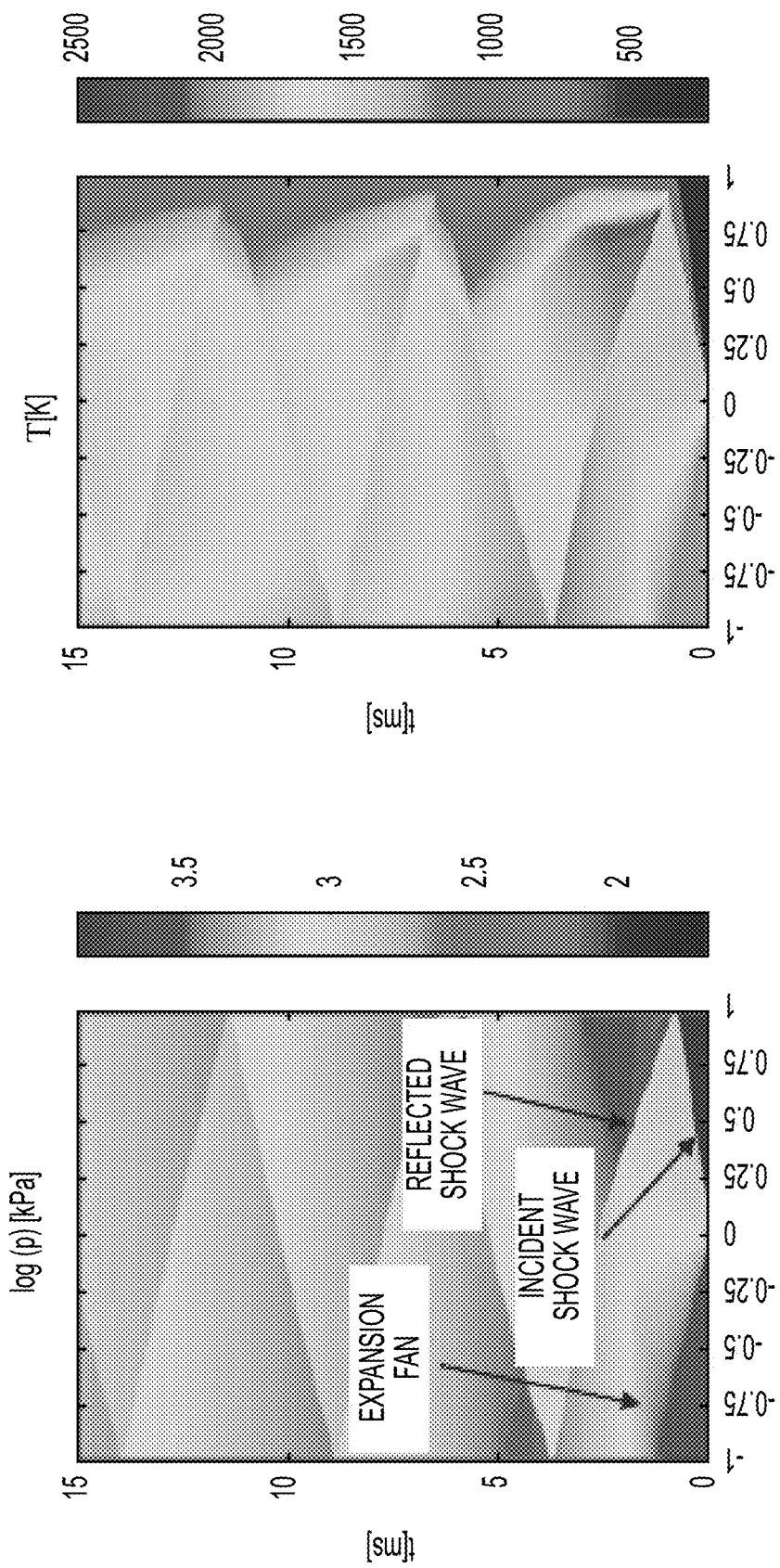
FIGS. 5A-5D show a series of plots showing contours of pressure, temperature, Mach number, and velocity in a shock tube as functions of time.
Figures 5C, 5D:
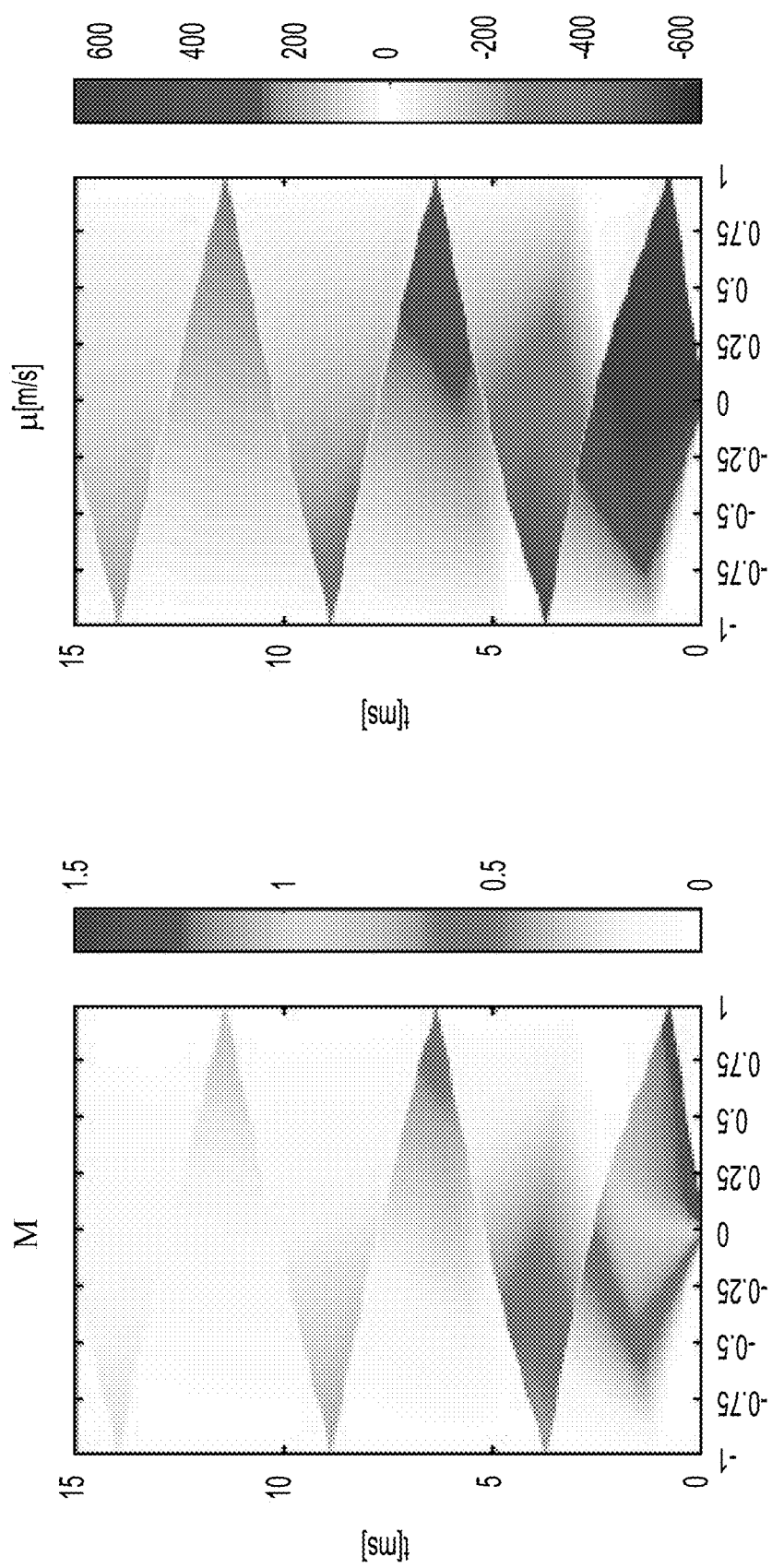

FIGS. 5A-5D shows color or shaded contours of pressure in FIG. 5A, temperature in FIG. 5B, Mach number in FIG. 5C, and velocity in the shock tube in FIG. 5D, as functions of time, i.e., in the distance-time space. The horizontal axis of each contour represents non-dimensional distance along the tube (x/L). The vertical axis represents time. Numbers next to each contour represents the minimum and maximum value of the contoured variable plotted in the distance-time space. Due to the relatively high-pressure differences between the driver and driven gases (i.e. $P_4 \gg P_1$), the pressure contours are given in logarithmic form to enhance the visibility of shock and expansion waves. The pressure plot shows compression of $NH_3$ by both incident and reflected shock waves. In addition, the attenuation of the shock waves due to viscous effects can be seen as time progresses. The temperature plot indicates a temperature rise for $NH_3$ from its initial 400 K is expected through shock heating to a high temperature ranging between 948 K and 1805 K. However, the highest-temperature zone is not near to the right wall (e.g., State 5). In fact, the highest-temperature region is offset from the end wall, and starts at the contact surface separating the compressed $NH_3$ gas and the $N_2$ gas and continues in the hot $N_2$ region after the reflected shock wave travels to the left and compresses $N_2$. This is different from a typical shock tube where the driver gas and driven gas usually have equal or near-equal initial temperatures. The Mach number and velocity plots show the flow directions. The incident shock wave has induced a supersonic region in the post-shock gas.

Figures 6A, 6B, 6C:
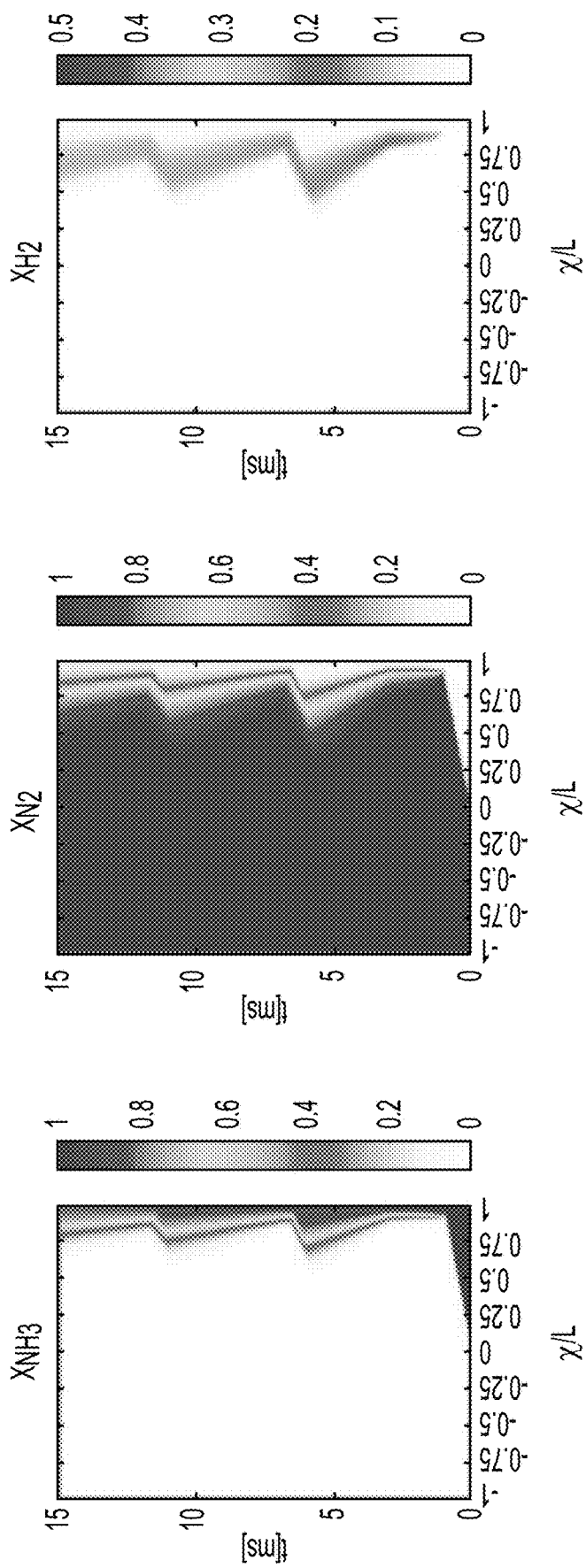
FIGS. 6A-6C show an additional series of plots showing mole fraction contours of $NH_3$ (left), $N_2$ (middle), and $H_2$ (right) in a shock tube as functions of time.

The species contours shown in FIGS. 6A-6C outline the temporal and spatial evolution of molar fractions for $NH_3$ in FIG. 6A, $N_2$ in FIG. 6B, and the resulting $H_2$ in FIG. 6C. In FIG. 6A the $NH_3$ concentration plot shows the gas is pushed by the incident shock wave towards the right wall where it starts to partially decompose to $N_2$ and $H_2$. In FIG. 6B the $N_2$ concentration plot indicates the gas penetrates into the driven section of the tube, and after about 1 millisecond the (first) reflected shock wave stops the gas penetration. In FIG. 6C the $H_2$ concentration plot shows formation of hydrogen far away from the wall and near to the contact surface between the compressed $NH_3$ and the $N_2$. There is still some fuel-to-hydrogen conversion taking place next to the wall, but much less than further away from the wall.

To show the temperature range of each species, FIGS. 7A-7C are presented where the temperature field for each species is shown. In this layout, the peak temperature of each species along with its location and time of its occurrence can be determined. In FIG. 7A for $NH_3$ a maximum temperature up to 1700 K can be obtained which is sufficient for ammonia decomposition. In FIG. 7B the $N_2$ temperature increases beyond 2000 K and in FIG. 7C the $H_2$ temperature exceeds 1800 K in some locations which is a temperature suitable for hydrogen production.

Figure 8:
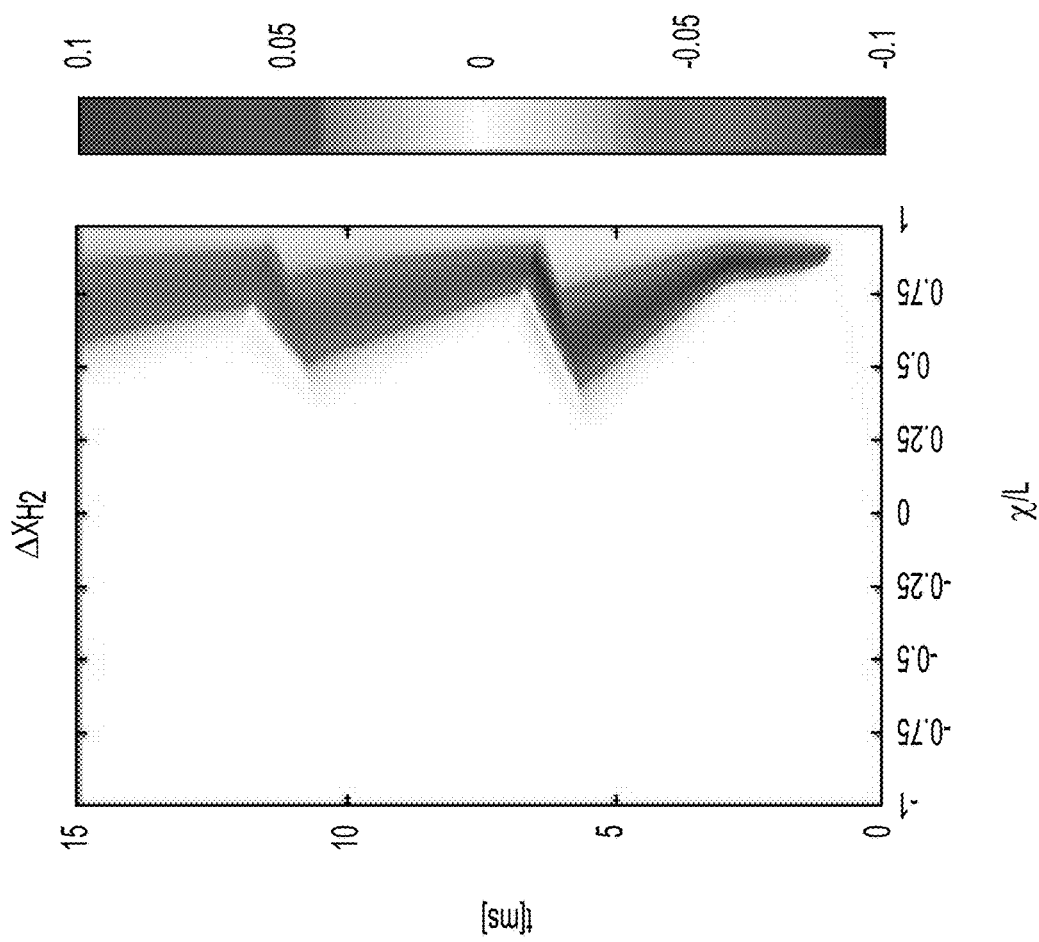
FIG. 8 shows a plot showing change in hydrogen mole fraction due to endothermic effect.

To explore the impact of the temperature drop due to the endothermic effect on $H_2$ production, FIG. 8 is provided which predicts the difference in hydrogen molar fraction produced with and without endothermic effect. This was achieved by setting the heat source term accounting for the endothermic heat absorption to zero. The plot shows that without the endothermic effect there would be almost 10% greater mole fraction of hydrogen.

Figure 9:
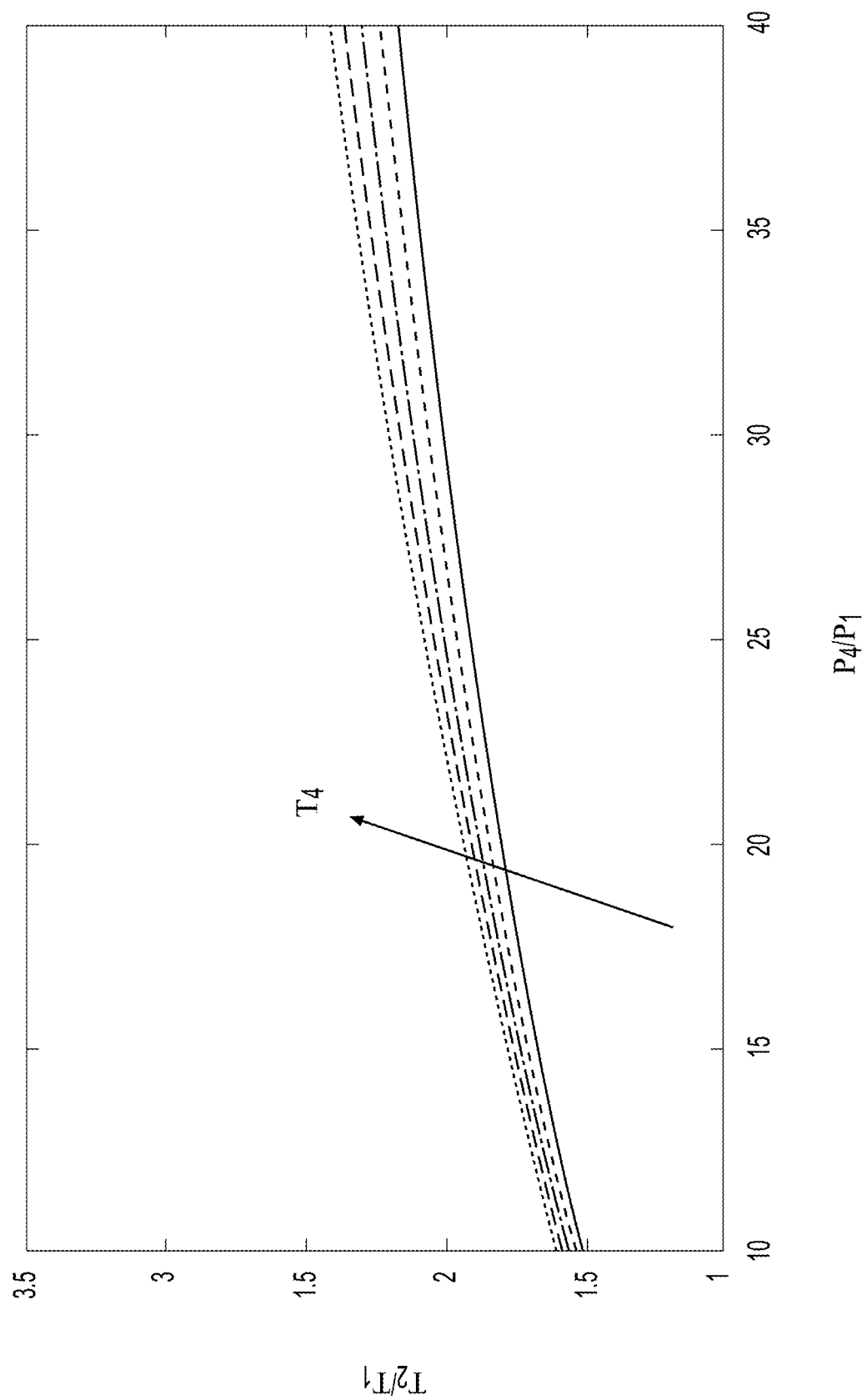
FIG. 9 is a graph depicting temperature rise across an incident shock wave, as a function of pressure ratio between driver and driven sections and initial temperature of the driver gas.
Figure 10:
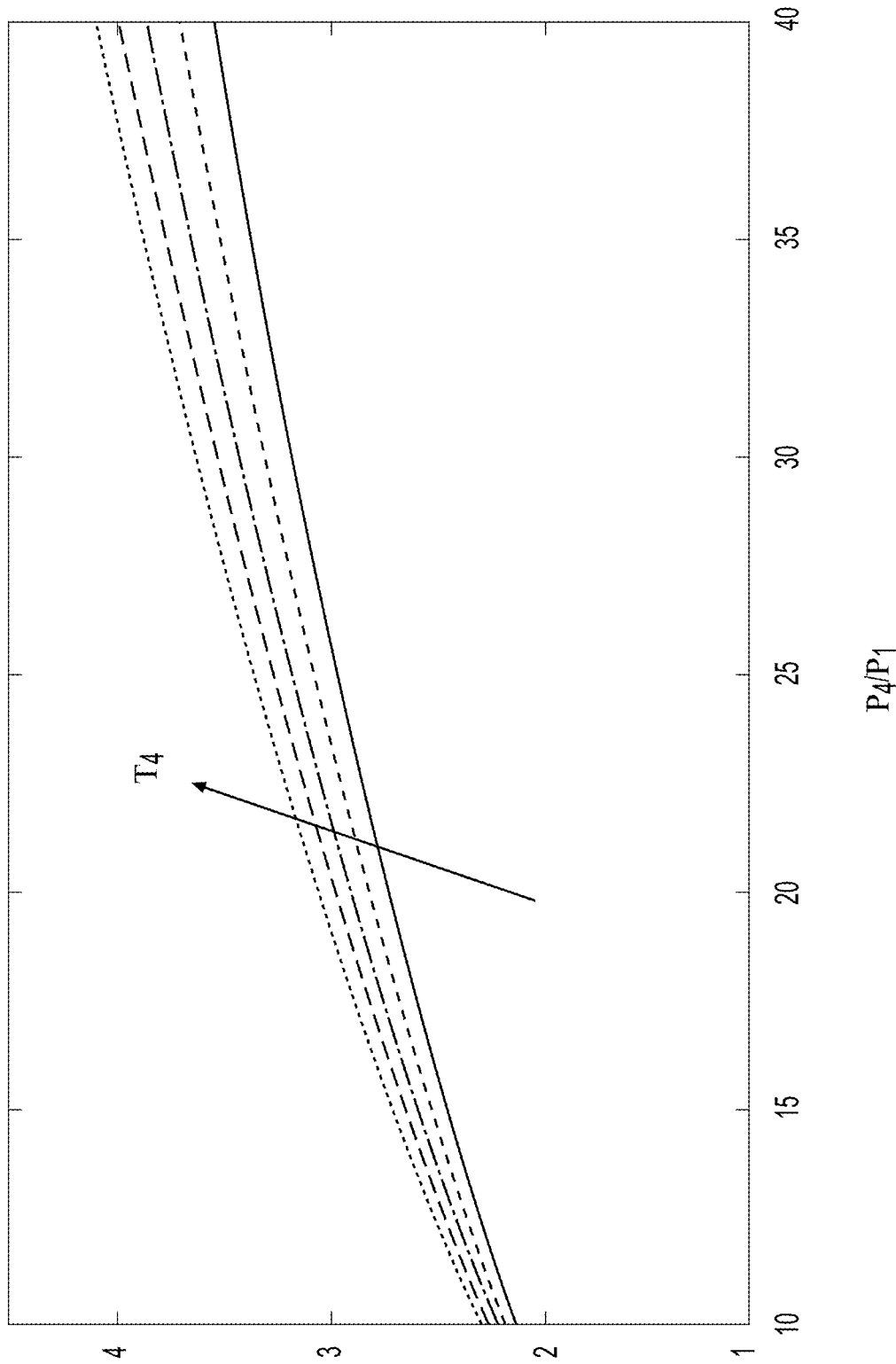
FIG. 10 is a graph depicting temperature rise across both incident and reflected shock waves, as a function of pressure ratio between driver and driven sections and initial temperature of the driver gas.

To investigate the influence of the driver gas initial temperature on shock heating, temperature rises across the incident and reflected shock waves were calculated for a wide range of pressure ratios between the driver and driven sections. FIG. 9 shows the temperature rise across the incident shock wave ($T_2/T_1$) as a function of pressure ratios in the shock tube ($P_4/P_1$) by varying the driver gas initial temperature ($T_4$) in increments of 200 K from 1300 K to 2100 K. The pressure in the driven section is assumed to be at ambient conditions of 1 atm and 300 K. Both sections are initially at rest. It is seen that by increasing the driver gas initial temperature, greater temperature rise across the incident shock wave is obtained. Similarly, FIG. 10 illustrates the temperature rise across the combination of the incident-reflected shock waves ($T_5/T_1$) as a function of pressure ratio in the shock tube by varying the driver gas initial temperature. The behavior of this temperature rise is similar to that in FIG. 9. It is seen that temperature rises beyond 3 can be attained for the pressure ratio above 30 in the shock tube, confirming the potential of shock heating to achieve sufficiently large temperatures to initiate ammonia cracking even with relatively moderate initial driver and driven temperatures provided the shock compression is sufficiently strong.

FIG. 9 shows the temperature rise across an incident shock wave, while FIG. 10 shows the temperature rise across both incident and reflected shock waves as functions of pressure ratio between driver and driven sections and initial temperature of the driver gas.

Figure 11:
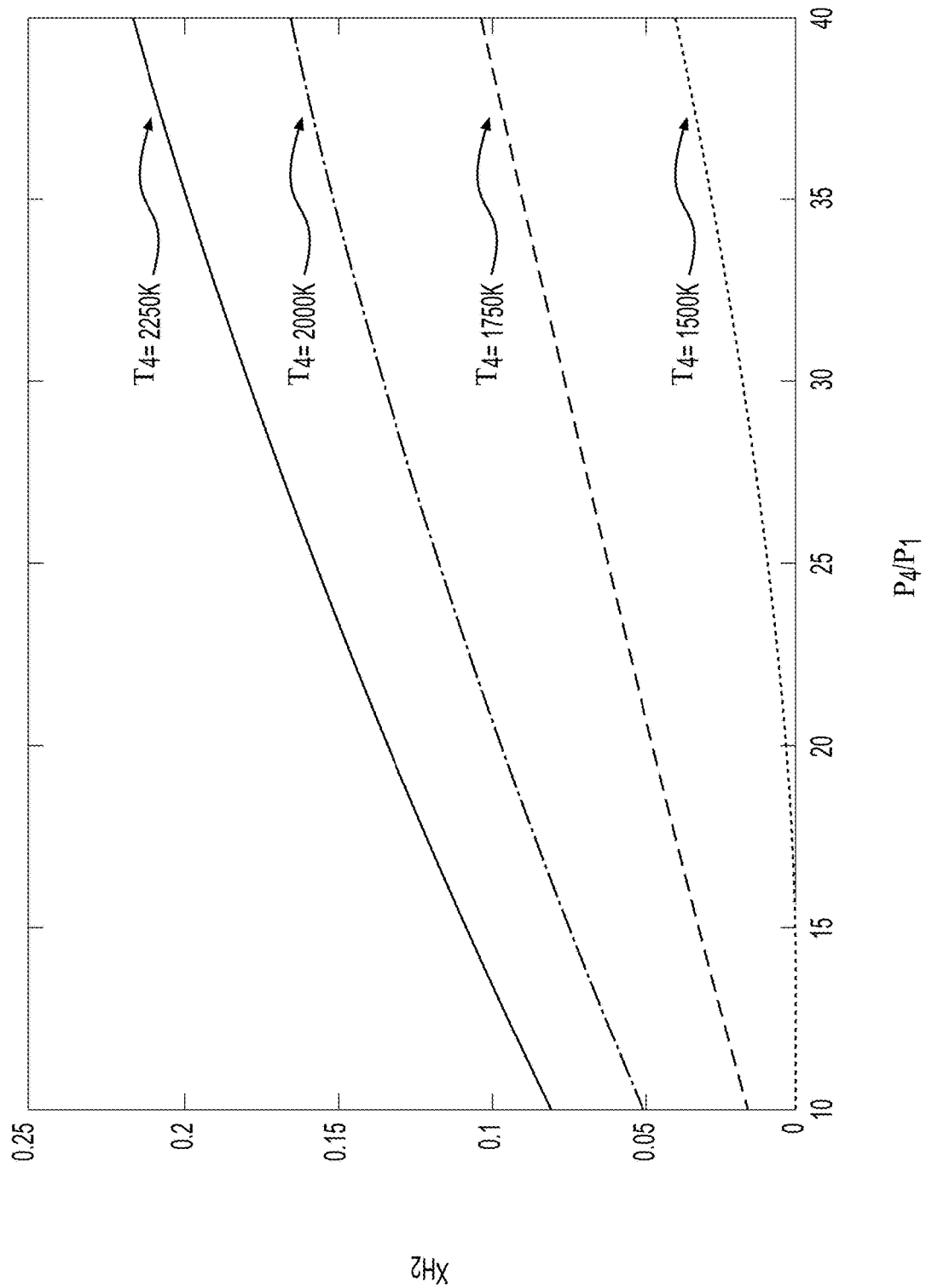
FIG. 11 is a graph depicting hydrogen molar fraction as a function of pressure ratio between driver and driven sections and initial temperature of the driver gas

Finally, FIG. 11 shows effect of initial temperature of the driver gas and pressure ratio between driver and driven sections on molar fraction of hydrogen generated through the ammonia cracking process. Both parameters have positive influence on hydrogen production. Residence time between the reflected shock wave and the right running expansion fan ranges between 5.1 milliseconds at the highest pressure ratio and 5.4 milliseconds at the lowest pressure ratio. This indicates that the relationship shown in FIG. 11 is driven primarily by shock heating effects rather than residence time.

Inner Working Principles of a Through-Flow Wave Reformer

Figure 12:
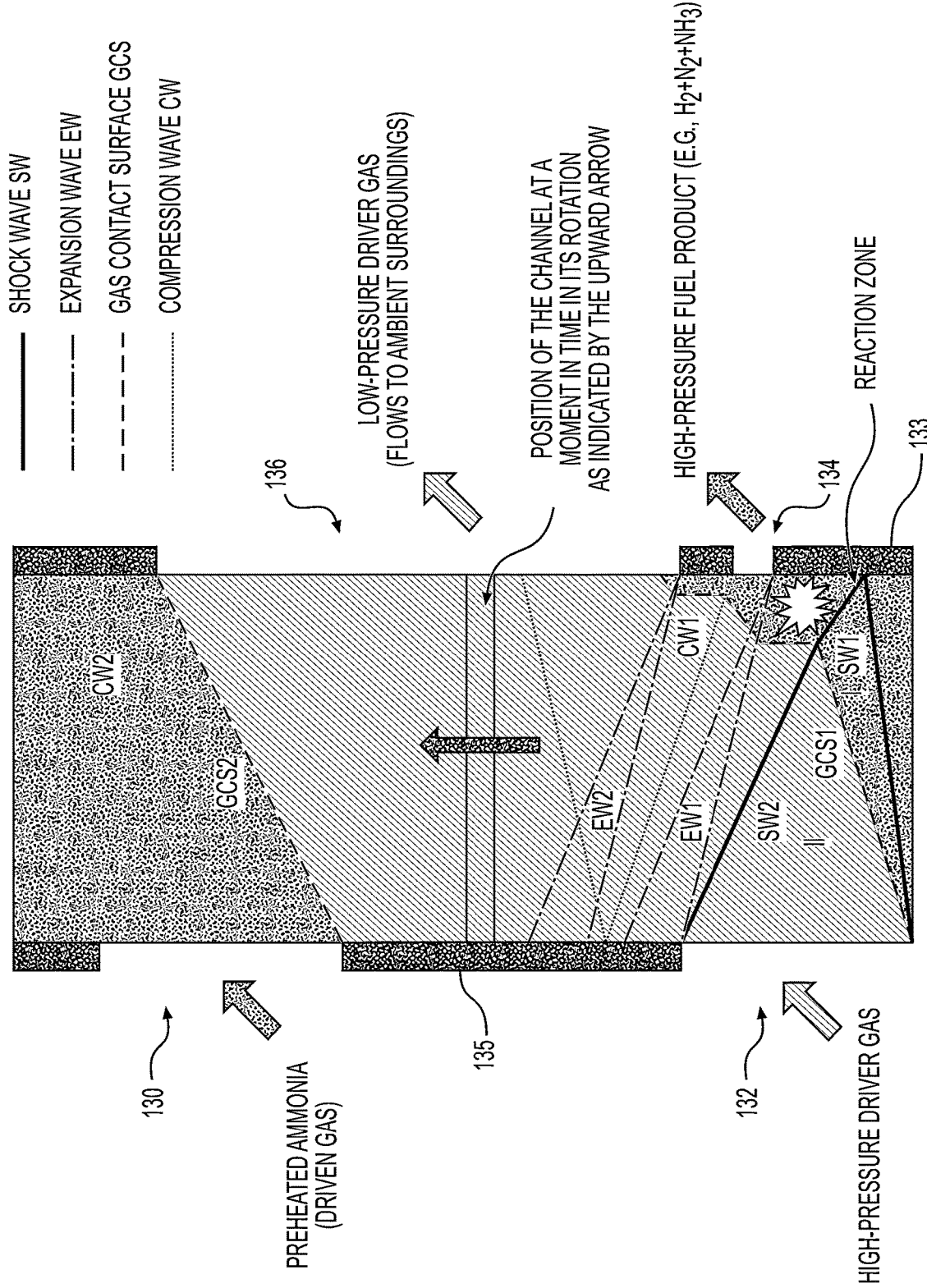
FIG. 12 is a wave diagram for a four-port through-flow wave reformer.

To better understand how a wave reformer operates, it is useful to investigate the physical phenomena occurring in the channels inside the rotor. This is traditionally studied by unrolling the rotor channels in a tune-distance domain, often termed as the wave diagram. This is shown in FIG. 12 where it schematically illustrates an unwrapped demonstration of a through-flow reformer, described in FIG. 2, with the rotor channel moving upward. In this fashion, the circular motion of the rotor channels is represented by straight translatory motion. The wave diagram portrays the position of the ports, the wave fronts, and gas interfaces during each phase of the cycle which is useful for visualizing the processes that occur in a single cycle of a wave machine. In the wave diagram, the horizontal axis represents the rotor axial length and the vertical axis is time (or rotational angle). The top of each wave diagram is looped around and joined to the bottom of the diagram, and the journey of a channel of the wave rotor is periodic. The vertical black rectangles on each side of the diagram represents temporal locations of an endplate during which the inlet and outlet ports are closed. The diagonal lines are either the propagation lines (trajectories) of the waves or contact surface boundaries between the fluids (as labeled).

In FIG. 12, the blue or lighter gray area represents the driven or reacting gas (ammonia) and the red or darker gray area represents the driver gas. Each cycle employs two inflow ports, 130 and 132, where ingress of the fresh high-pressure driver gas via port 132 and reacting preheated ammonia fluids via port 130 are fed into the moving channels. Also shown are two outflow ports, 134 and 136, where high-pressure fuel product is discharged via port 134 and a low-pressure driver gas is discharged via port 136 from the rotor channels. In the proposed cycle, where the driven or reacting gas is chosen to be preheated ammonia, a mixture of ammonia and hydrogen is formed and extracted as a high-pressure fuel product leaving the rotor channels via port 134. In the following, the events occurring in a channel during one complete cycle will be described and it will be described in detail how shock and expansion waves are neatly employed to transfer the energy directly between the gases and generate hydrogen in the wave reformer.

Each cycle consists of two processes: a high-pressure part and a low-pressure part. The purpose of the former is compress and heat up ammonia and deliver it to a combustion chamber. The latter is devised to discharge the burned gas, and cool and fill the channel with a through-flow of fresh ammonia again. In FIG. 12, the high-pressure part of the cycle begins at the bottom of the wave diagram where the flow within the channel is entirely filled with the preheated low-pressure driven gas (ammonia). At this instance, the end ports 130 and 136 are closed and the driver gas entry port 132 (left side of diagram) suddenly opens. When the driver gas port 132 opens, the high-pressure driver (burned gas from the burner) enters the channel and a primary shock wave SW1 is generated that travels into the channel. The primary shock wave SW1 travels rightward (solid line), compressing the high-pressure driven gas (ammonia). The shock wave SW1 runs through the channel at a speed faster than the speed of sound and causes an abrupt rise of pressure. Behind the wave is the gas contact surface (dotted line GCS1) separating the driver gas (red/lighter area, region II) from the compressed driven gas (blue/darker or stippled area, region I). This contact surface GCS1 follows the shock wave SW1 to the right but at a rate that is slower than the shock wave. The shock wave SW1 arrives at the right end of the channel and is reflected from an end wall 133. The reflected shock wave SW2 now propagates toward the left, further increasing the pressure and temperature of driver gas by converting the kinetic energy into heat in the reflection (or reaction) zone behind the wave. This immediately initiates pyrolysis of the reactant gas. The reflected shock wave SW2 continues propagating to the channel's left end, stopping the motion of the doubly compressed driven gas (ammonia) and the driver gas. This is indicated by the contact surface GCS1 turning into a vertical line. The peak temperature in the reaction zone can exceed 1500 K depends on the initial temperature of the reacting gas and Mach number of the primary shock wave SW1. With sufficient compression by the primary shock wave (SW1) and the reflected shock wave (SW2), the peak temperature and consequently the thermal dissociation of ammonia to hydrogen occurs in the reflection (or reaction) zone (star explosion mark) prior to opening the exit port 134 for exhausting the high-pressure fuel product. The reaction zone is maintained until the opening the exit port 134. When the right end of the channel opens (i.e. outlet port 134 for exhausting the high pressures fuel product), an expansion wave (dashed-dotted line EW1) is generated from the lower corner of the exit port 134 propagating to the left. The expansion wave EW1 expands and expels the decomposed gas to the exit port 134 heading to a combustor. Closing of the driver gas inlet port 132 is timed with the arrival of the expansion wave EW1 front to the channel left end wall 135. Meanwhile, by closing the high-pressures fuel product exit port 134, a very small amount of ammonia will be retained in the channel and a compression wave (doubled solid line CW1) is generated from the upper corner of the exit port 134 propagating to the left and stopping the channel flow. This is the end of the high-pressure part. At this very moment, the fluid trapped in the channel consists primarily of burned gas and a very small portion of the doubly compressed ammonia, preventing the hot gas from reaching the outlet port 134 or contacting the right end wall 138.

The low-pressure part of the cycle starts when the entire driver gas is discharged to the surrounding by opening the exhaust gas port 136 thereby generating another expansion wave EW2 generated from the leading corner of the exhaust port 136. By opening the driven gas entry port 130, the pre-heated ammonia entering the channel from the left is separated by a contact surface GCS2 from the expanded burned gas leaving the channel from right, i.e., an overlap process. The two gases are separated from each other by a contact surface (GCS2). While the overlap process continues, the scavenging of gas through the exit port 136 is stopped by closing the exhaust port 136. The closing of the exhaust port 136 is timed with the arrival of the driven gas via inlet port 130 to the rightend of the channel Closing the exhaust port 136 generates another compression wave CW2 propagating to the left stopping the flow of ammonia and increasing its pressure and temperature slightly. When the compression wave CW2 meets the upper corner of the inlet port 130, the port 130 closes leaving the channel fully filled with ammonia and the next cycle can be initiated.

Inner Working Principles of A Reverse Flow Wave Reformer

Figure 13:
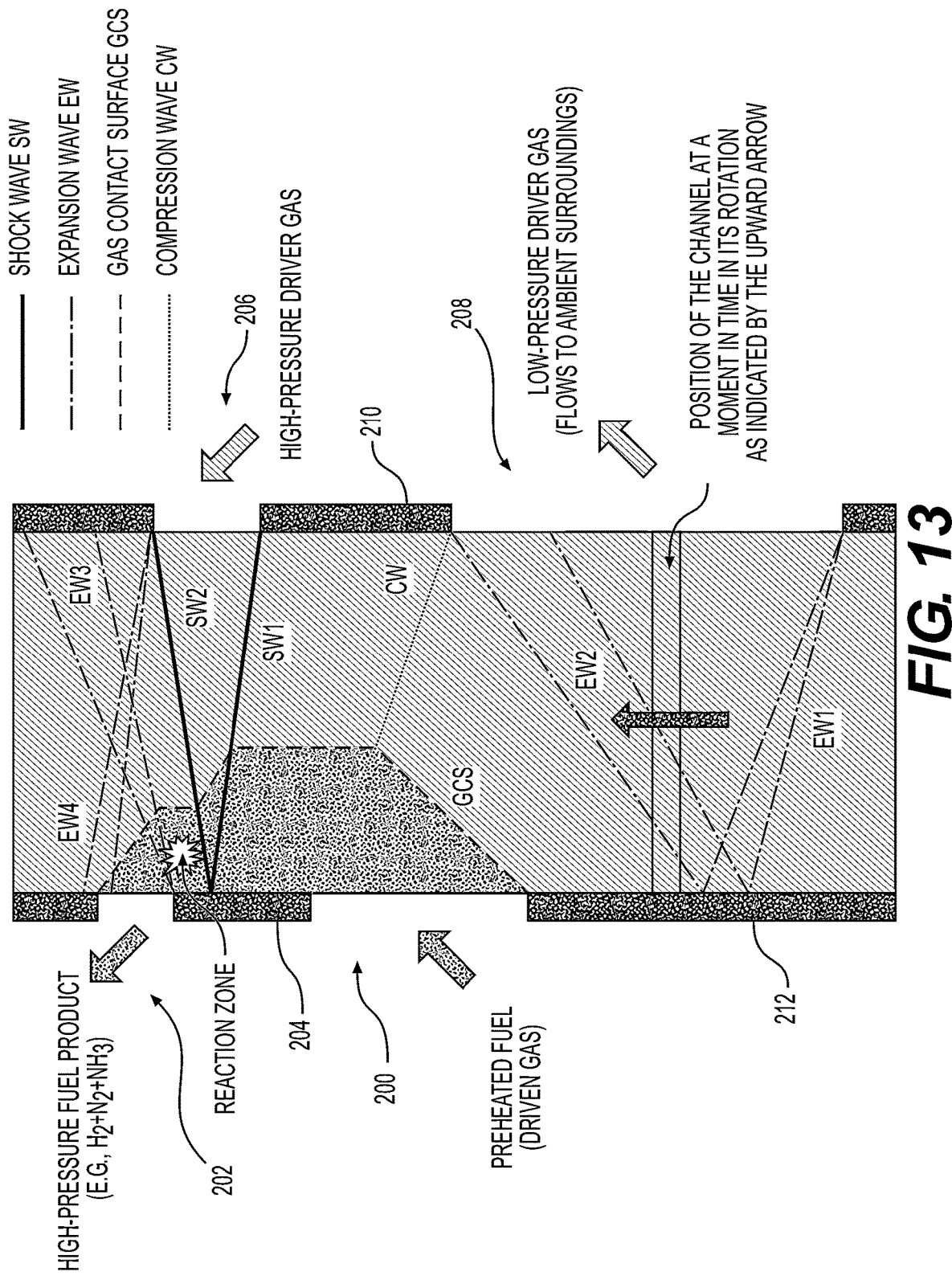
FIG. 13 is a wave diagram for a four-port reverse-flow wave reformer.

It is also possible to decompose the reactant gas in a different wave cycle introduced as the reverse-flow cycle as shown in FIG. 13. The gas dynamic process for this configuration is similar to that described in FIG. 12, but here the reactant fuel (ammonia) and processed fuel enter via port 200 and leave from port 202 in the left endplate 204. Likewise, the high-pressure and expanded driver gases enter via port 206 and leave via port 208 from the right endplate 210.

The ammonia pyrolysis is again achieved through shock compression by both incident and reflected shock waves, but here the reactant fuel (ammonia) and processed fuel enter and leave from the left end plate.

In the following, the events occurring in a channel during one complete cycle will be described and it will be described in detail how shock and expansion waves are neatly employed to transfer the energy directly between the ammonia gases and generate a dual ammonia and hydrogen fuel product in the wave reformer.

In FIG. 13, the cycle begins in the bottom part of the wave diagram where the flow within the channel consists of the driven gas from a previous cycle. As the right end of the channel opens to the relatively low-pressure outlet port 208, an expansion fan EW1 originates from the leading edge of the outlet port 208 and propagates into the channel, expanding and discharging the used driver gas to the surrounding. The expansion fan EW1 reflects off the left wall 212 as EW2 and further reduces the pressure and temperature in the channel. This draws fresh low-pressure driven gas, the reacting gas (light gray), into the channel when the inlet port 200 starts to open on the left side of the channel. This entering fresh reacting ammonia gas is separated from the residual driver gas (darker gray) by a contact surface shown at GCS. When the reflected expansion fan EW2 reaches the upper edge of exhaust port 208, it slows the outflow and reflects back to the left as a compression wave CW. The compression wave CW travels toward the inlet port 200 stopping the channel flow. As the compression wave CW reaches the upper corner of the inlet port 200, that port closes gradually. At this moment, the channel is closed at both ends filled with the reacting ammonia gas separated from the residual driver gas by a contact surface GCS denoted by a vertical line, and the channel fluid is at rest relative to the rotor. Through continuous rotation of the rotor, the fresh driver gas entry port 206 opens, and the channel right end is exposed to the high-pressure driver gas. Because the driver gas pressure is higher than the gas pressure in the channel, a shock wave SW1 is triggered starting from the lower corner of the high-pressure inlet port 206. The shock wave SW1 runs to the left through the channel and causes an abrupt rise of pressure and temperature inside the channel. As the shock wave SW1 reaches the end of the channel, a reflected shock wave SW2 is generated, propagating to the right back into the channel which compresses the channel fluid further. Passage of the shock waves SW1 and SW2 through the reactant ammonia gas raises it to reaction temperature, thus thermal decomposition of the ammonia occurs behind the reflected wave in a hot reaction zone. When the secondary outlet port 202 opens, the doubled-compressed reacting product (e.g. ammonia plus hydrogen and any intermediaries) is expelled from the channel by an expansion fan EW3 generated at the lower corner of the outlet port 202 propagating downstream toward the right endplate. The closure of the inlet port 206 is timed with the arrival of the reflected shock wave SW2. At this moment, another expansion fan EW4 originates from the upper corner of the inlet port 206 and propagates to the left toward the other end of the channel which eventually brings the channel flow to rest. When the expansion fan EW4 reaches the end of the channel, the outlet port 202 closes and the flow in the rotor channels stops and contains the driver gas onlt. At this point, the channel will go through the same cycle process. The described sequence of events occurs successively in each of the reactor channels as the drum is rotated so that a continuous supply of processed gas is discharged into the outlet port.

It is important to acknowledge that to achieve maximum yield of hydrogen during ammonia decomposition in the reaction zone, the peak temperature and residence time needed to extend to their maximum values. In practice the peak temperature in the reaction zone decreases sharply because the ammonia-pyrolysis reaction is endothermic with energy consumed and temperature decreasing as the reaction proceeds. Thus, at a lower temperature a longer residence time is required to achieve high ammonia conversion. Ideally, this reaction time can be changed by adjusting the rotor speed, the channel length, and port arrangements. However, the rotor speed and the position and width of the ports are already selected with the speed of the propagating waves to avoid all undesired flow phenomena in the device. Therefore, it is beneficial to increase the residence time as long as possible by allowing the processed gas to remain longer in the channel instead of expanding the gas quickly.

Figure 14:
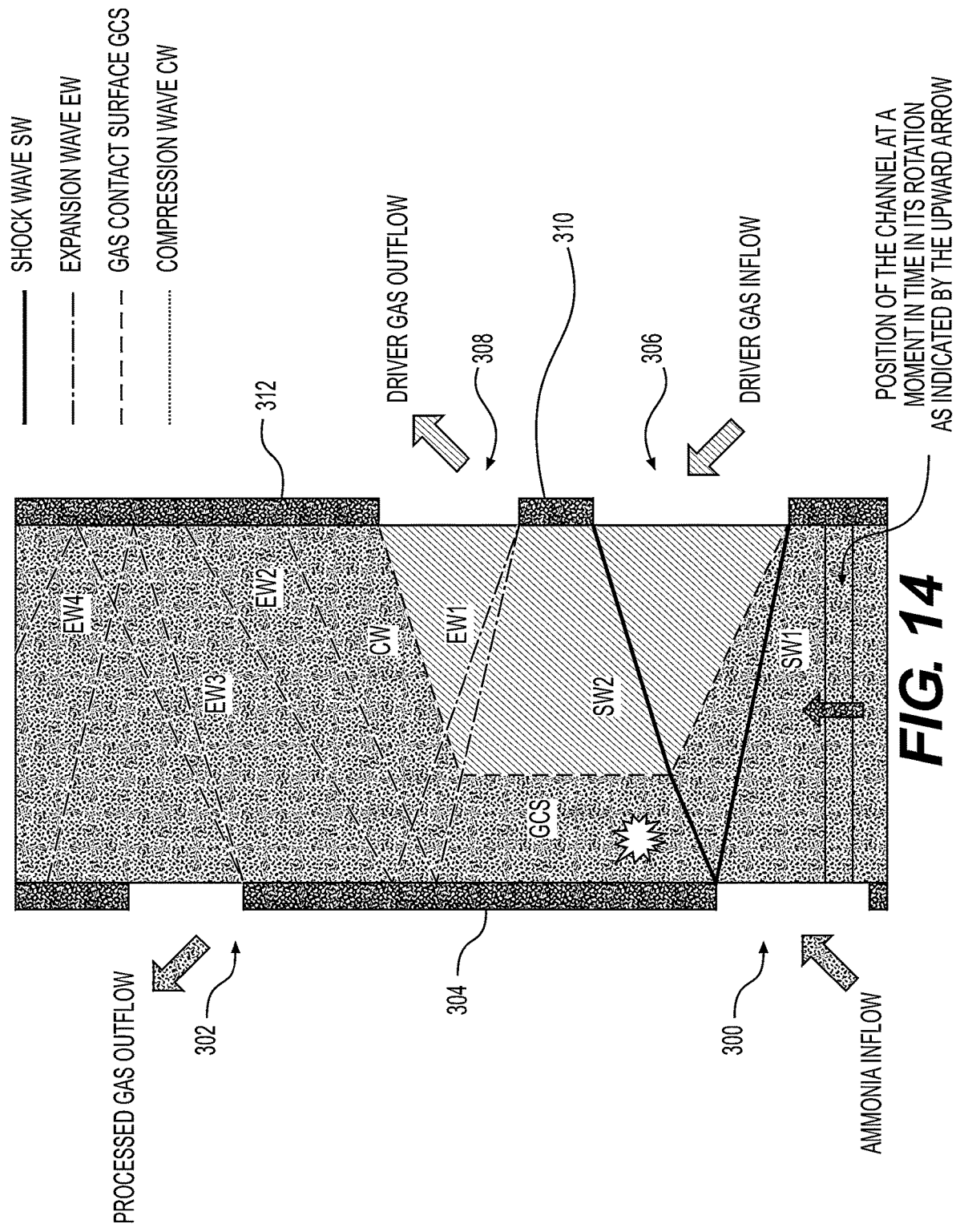
FIG. 14 is a four-port reverse-flow wave diagram using an extended reflected end-plate.

Inner Working Principles of a Reverse-Flow Wave Reformer Using a Reflected Endplate A wave cycle that allows the driven ammonia gas at high temperature to remain in the channel for a longer period of time is schematically illustrated in FIG. 14.

The cycle starts at the bottom FIG. 14 where preheated reactant gas (ammonia) is flowing into the channel from the left inlet port 300 while the high-pressure driver gas starts to enter from the right through opening the driver inlet port 306. The impact of the driver gas upon the reactant gas (ammonia) generates a traveling shock wave SW1 toward the left endplate 304. As it moves, the shock wave SW1 heats and compresses the gas, setting it in motion in the direction of the shock wave SW1. Behind shock wave SW1 is the contact surface (dotted line GCS) separating the driver gas (red/stippled patterned area) from the preheated ammonia (blue/light gray lined area). By the time the shock wave SW1 reaches the channel left end, the reactant gas (ammonia) port 300 closes. A new shock wave SW2 is reflected from the endplate 304 back toward the channel right end. At this moment, the reactant gas (ammonia) has been compressed and heated both by the primary and reflected shock waves, SW21 and SW2, to the selected conditions under which the reaction takes place near to the reflecting endplate 310. The driver gas velocity goes to zero when the reflected shock wave SW2 meets the driver gas, hence, the gas contact surface turns into a vertical line. The arrival of the reflected shock wave SW2 to the upper corner of the driver gas inlet port 306 is timed by closure of this port and the flow of driver gas into the channel cuts off. Following a further rotation of the channels, the driver gas outflow port 308 opens. Opening the driver gas outflow port 308 generates an expansion wave EW1, cooling both gases as it passes along the channel. The expansion wave EW1 induces a velocity in the channel toward the driver gas outflow port 308, and the driver gas starts to leave the channel as indicated by the gas contact surface GCS leaning to the right direction. The maximum temperature attained by the process will start to decay shortly after the expansion wave EW1 passing through the heated reactant gas strikes the left endplate, and another expansion wave EW2 is reflected downstream. The subsequent passage of the expansion waves EW21 and EW2 through the reactant gas rapidly cools the reacted gas which "freezes" the high-temperature reaction products. When the driver gas has fully left the channel, the driver gas port 308 closes. By closing the driver gas outlet port 308, a compression wave CW1 is generated which compresses the processed gas further and stops its motion. When the processed gas port 302 opens, a third expansion wave EW3 is generated those travels upstream, causing the discharge of product gas out of the channel via port 302. Closing the product gas port 302 takes place thereafter when most of the product gas has been expelled from the channel Full evacuation of the product gas is usually unlikely. The expansion wave EW3 strikes the right end wall 312 and is reflected back into the channel in the form of another expansion wave (EW4). By closing the product gas outlet port 302, another compression wave CW2 is generated which stops the channel gas motion. Through steady rotation of the channels, the fresh ammonia enters the channels from its intake port 300, thereby completing the cycle.

Comparing wave diagrams in FIGS. 12, 13 and 14, it will be noted that the reflecting plate 304 in FIG. 14 has a greater circumferential extent than the similar wall 133 in FIGS. 12 and 204 in FIG. 13, allowing for the reaction products to remain longer time in the reactor which in turns produces a higher fuel-to-hydrogen conversion.

Jet Engine Example

In this section, it will be described how the through-flow wave reformer can be adapted for cracking ammonia into a hydrogen gas mixture for obtaining sustainable aviation turbine power. First, it is envisioned that pure liquid ammonia is stored in the airplane fuel tank as a fuel. The fuel is then reformed or cracked by a shock wave reformer to produce ammonia/hydrogen blends in the engine.

It is preferred to have a shock wave reformer associated with each engine with each having a fuel flow capacity equal to the full thrust demands of an engine or alternatively providing fuel flow at flow rates greater than what an engine might demand at full thrust conditions. It is also envisioned to employ one or more redundant shock wave reformers for each engine, but other shock wave reformer arrangements could also be used. For example, where one high-capacity shock wave reformer was provided to feed fuel to all engines from a central point in the aircraft along with one or more redundant shock wave reformers.

Figure 15:
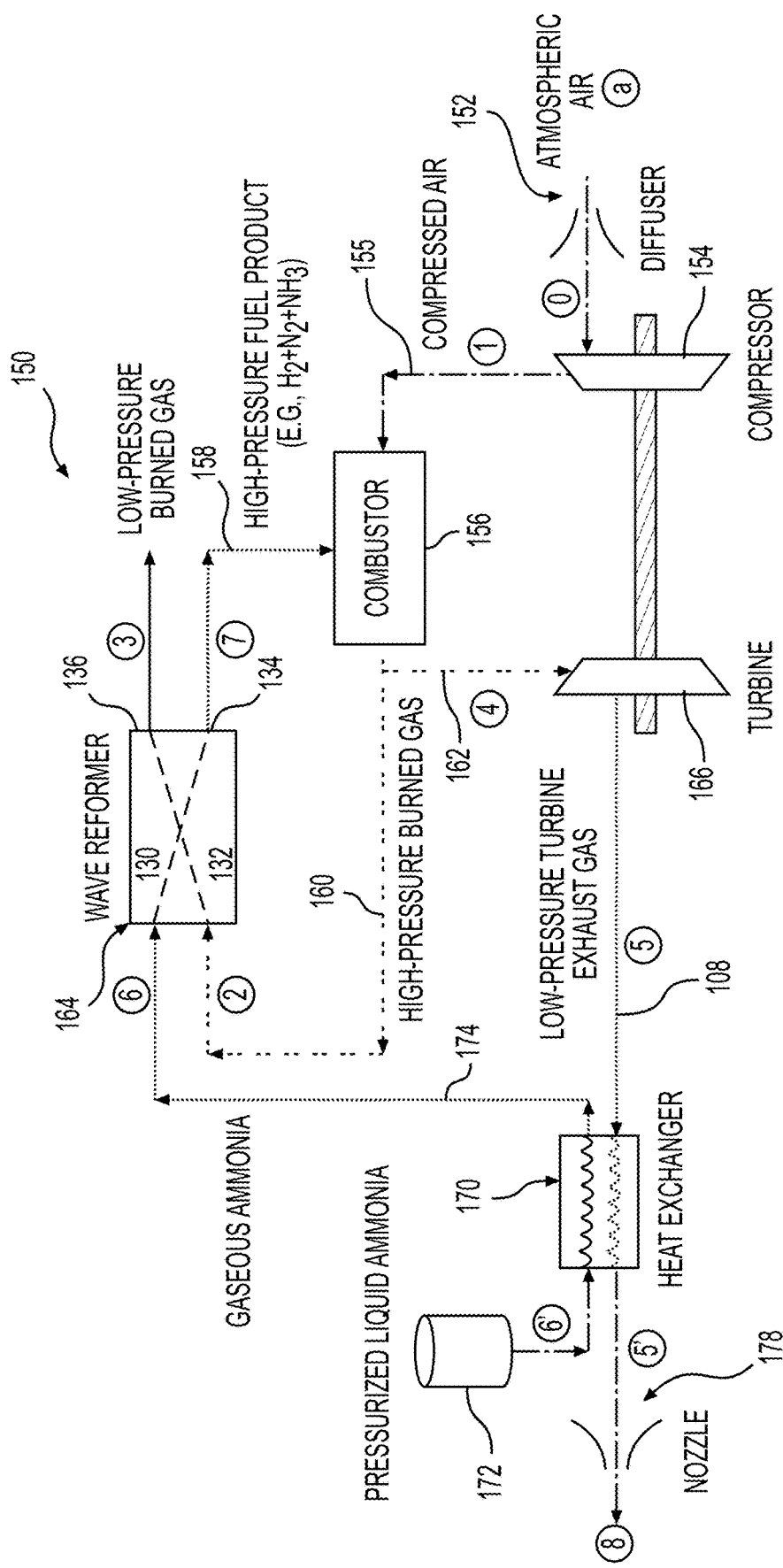
FIG. 15 is a schematic drawing of one embodiment of a power system and fuel supply system for a jet engine using a wave reformer to produce a continuous supply of fuel to a turbine to power an aircraft engine.

A conceptual diagram of the system to reform ammonia to hydrogen in a jet engine 150 is illustrated in FIG. 15. In this proposed arrangement, a typical inlet 152 (diffuser) decelerates the incoming atmospheric air (State a). The low-speed air enters a compressor 154 (State 0) where its pressure is increased by the compressor blades. The compressed air via line 155 is directed to a burner or combustor 156 (State 1) where it is mixed with the fuel injected into the combustor 156 via line 158. After the combustion process within the combustor 156, the discharged high-pressure burned gas splits into two lines 160 and 162. A small portion for example, 1-10%, of the discharged high-pressure burned gas is delivered via line 160 to the wave reformer 164 (State 2) through the opening of the first port 132 of the reformer. It must be kept in mind that bleeding gas from the combustor 156 to the wave reformer 164 would reduce the power produced in the turbine 166 of the jet engine 150, thus, amount of hot gas bled from the combustor 156 should be as low as possible and, for example this might be about the same amount or less than 10%. The combustor gas bleed via line 160 and port 132 is used to compress preheated ammonia residing in the channels that has entered from a second port 130 of the reformer (State 6). The incoming high-pressure gas (driver gas) at port 132 triggers a shock wave SW1, as shown in FIG. 12, in the rotor channel which compresses the ammonia (driven gas) within the rotating channels. Such a shock compression can amplify the temperature of the ammonia high enough for thermal decomposition to take place, yielding a product mixture of primarily ammonia, hydrogen, and nitrogen. After the wave rotor spins and the channel aligns with a third port 134 in the end plate, the channel end opens, and the produced blend of high-pressure hydrogen, ammonia, and nitrogen. This fuel mixture is injected into the combustor 156 (State 7) via line 158. After further rotation of the channels, the fourth port 136 opens and trapped, burned gas within the channels expands and flows to the surroundings (State 3). Alternatively, it is possible to use a heat exchanger to preheat the compressed air at State 1 before it enters the combustor, using the low-pressure, burned gas at State 3 (not shown). The efficacy of recovery this heat in State 3 will depend on its temperature and the percentage bleed flow required for the application.

The remaining (majority) or an amount that is greater than 90% of the high-pressure burned gas is delivered to the engine turbine 166 (State 4) via line 162. After work extraction in the turbine 166, the exhaust gas from the turbine 166 exits the system (State 5) via line 168. The exhaust gas enters a conventional heat exchanger 170 that heats up the liquid ammonia entering the heat exchanger from a fuel tank 172 (State 6). The liquid ammonia vaporizes across the heat exchanger 170 and is directed via line 174 to the second port 130 of the wave rotor 164 (State 6). The cooled exhaust gas leaving the heat exchange enters a nozzle 178 (State 5) where is accelerated and exhausted to the surroundings (State 8) producing the desired level of engine thrust in the case of an aircraft engine.

Therefore, in this novel system arrangement, the wave reformer 164 provides zero-carbon fuel for the combustor 156 using the energy contained in the high-pressure burned gas discharged in a continuous manner from the wave reformer 164. This arrangement enhances the combustion process and it is a new application of wave rotors in propulsion systems producing a dual-fuel blend of hydrogen and ammonia as clean fuel as an integrated part of an aircraft engine.

To predict flow properties in and out of the wave reformer, it is required to conduct mass and energy balance calculations for a particular engine application. A take-off condition of standard atmosphere, sea level was chosen as the design point. The design parameters of the baseline engine selected for this invention include a compressor pressure ratio of 39, a turbine total inlet temperature of 1830 K, and air flow rate of 1200 kg/s. A compressor isentropic efficiency of 87% was assumed for the compressor.

FIGS. 16A-16D represents a numerical modeling of a wave reformer using the baseline engine. For this specific design, the rotor length is considered 0.5 in rotating at 7000 RPM. The channel height and width of each channel is selected as 8.5 cm and 5.7 cm, respectively. The port numbers (2, 3, 6, 7) correspond to those used in FIG. 15. The contour plots show pressure in FIG. 16A, temperature in FIG. 16B, Mach number in FIG. 16C, and velocity in FIG. 16D as a function of time or azimuthal position (vertical axis) and position (horizontal) over one complete cycle of operation. A color or shading scale bar is provided to the immediate right of each contour plot. Axial distance is non-dimensionalised by channel length, L, and azimuthal position is represented by angular displacement, θ, and is non-dimensionalised by maximum angular displacement, $\theta_{max}$, which corresponds to one full rotation of 360 degrees. To facilitate the detection of shock and expansion waves, the pressure contours are shown on a logarithmic scale. The velocity contours of FIG. 16D indicate flow in positive x-direction in red and flow along the negative x-axis in blue. This highlights where undesired backflow regions occur and can guide adjustment of the port timing accordingly.

Figures 17A, 17B, 17C:
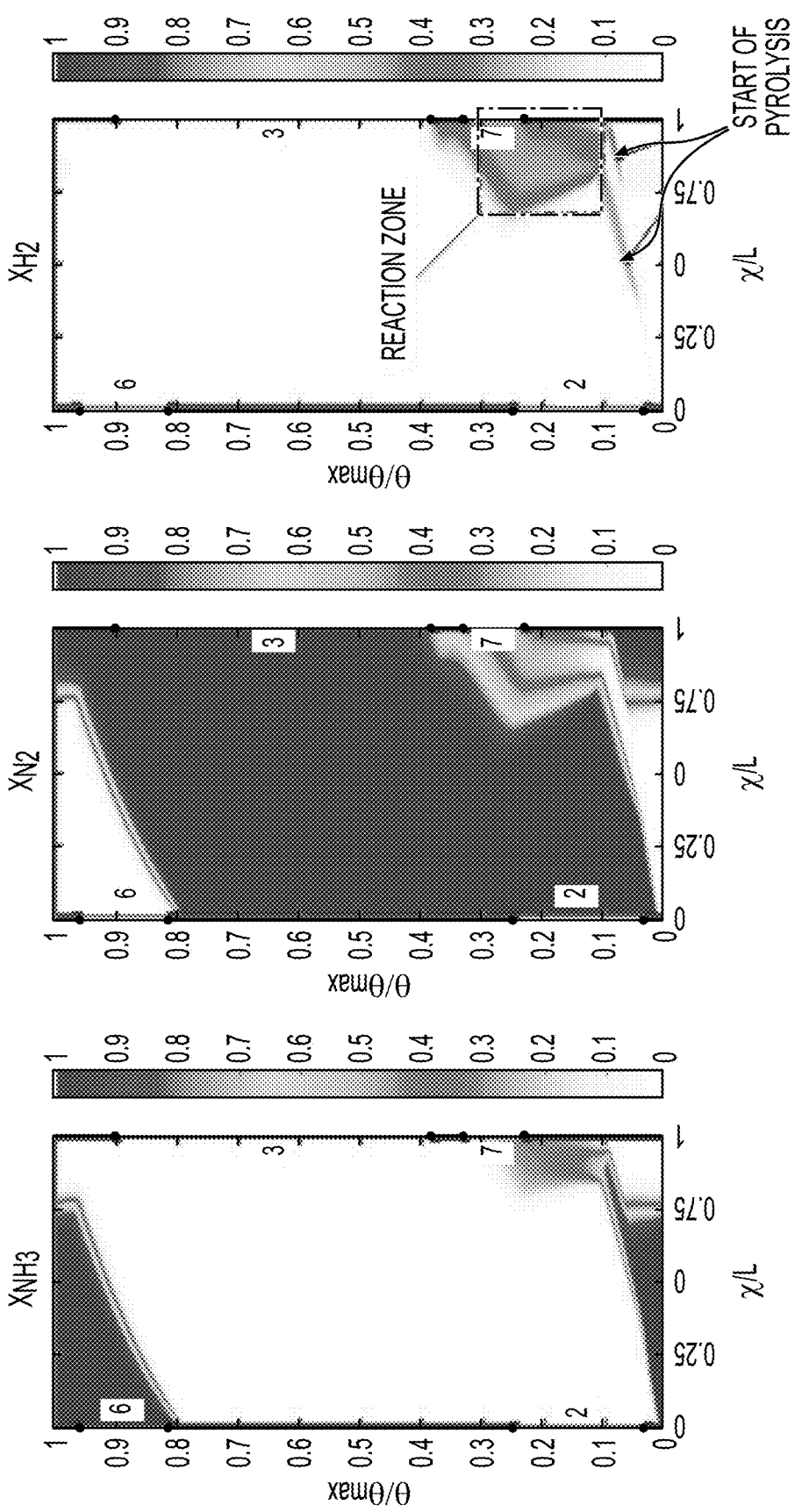
FIGS. 17A-17C show a series of species contour plots showing mole fraction of ammonia ($NH_3$), nitrogen ($N_2$) and hydrogen ($H_2$).

The flow field contours are accompanied by the species contours in FIGS. 17A-17C outlining the distribution of reactants ($NH_3$) and products ($N_2$ and $H_2$) expressed by the mole fraction X. Starting from the pressure plot, FIG. 16A_, the wave reformer cycle can roughly be divided into a high-pressure zone starting at $\theta/\theta_{max}=0$ until approximately $\theta/\theta_{max}=0.4-0.5$ and is followed by a low-pressure zone for the remainder of the cycle until $\theta/\theta_{max}=1$. The high-pressure zone is dominated by a shock wave system consisting of an incident and a reflected shock wave, which account for peak pressures and temperatures within the cycle. In addition to the incident/reflected shock wave system, the plots FIGS. 16A and 16B also show a relatively weak shock wave being generated upon closure of port 3 to the channel. This left travelling wave collides with the stronger incident shock wave forming a colliding shock wave pattern. In the wake of this, the induced supersonic flow is slowed down to near sonic and subsonic conditions, the static pressure increased as a consequence and the static temperature in the driver gas raised by approximately 100 K.

The mole fraction plots of the reactant and product species in FIGS. 17A-17C collectively show that—in contrast to the shock tube simulations—the colliding shock waves initiate thermal decomposition of the incoming driven gas along the contact surface to the driver gas where driver and driven gas mix. This takes place approximately 0.30 millisecond prior to the incident shock wave is reflected from the right end wall and the outline reaction zone. Only upon exposure to the reflected shock wave the center portion of the ammonia stream with the highest concentration starts to decompose into its products. Overall, the gas mixture remains in the main reaction zone for around 1.0 millisecond. Downstream of the reflected shock wave, the peak temperature is approximately 800 K lower than in the rest of the channel to the left, where higher temperature driver gas dominates. This temperature difference is a combination of two factors; first and foremost, the driven gas enters the channel at approximately 1000 K and thus at considerably lower temperature compared to the driver gas, where static inlet temperatures range at around 1600 K. Secondly, the reaction taking place within the reaction zone is endothermic in nature as shown in the shock tube tests and further drives the temperature difference across the channel, effectively slowing the reaction down.

Figures 16A, 16B:
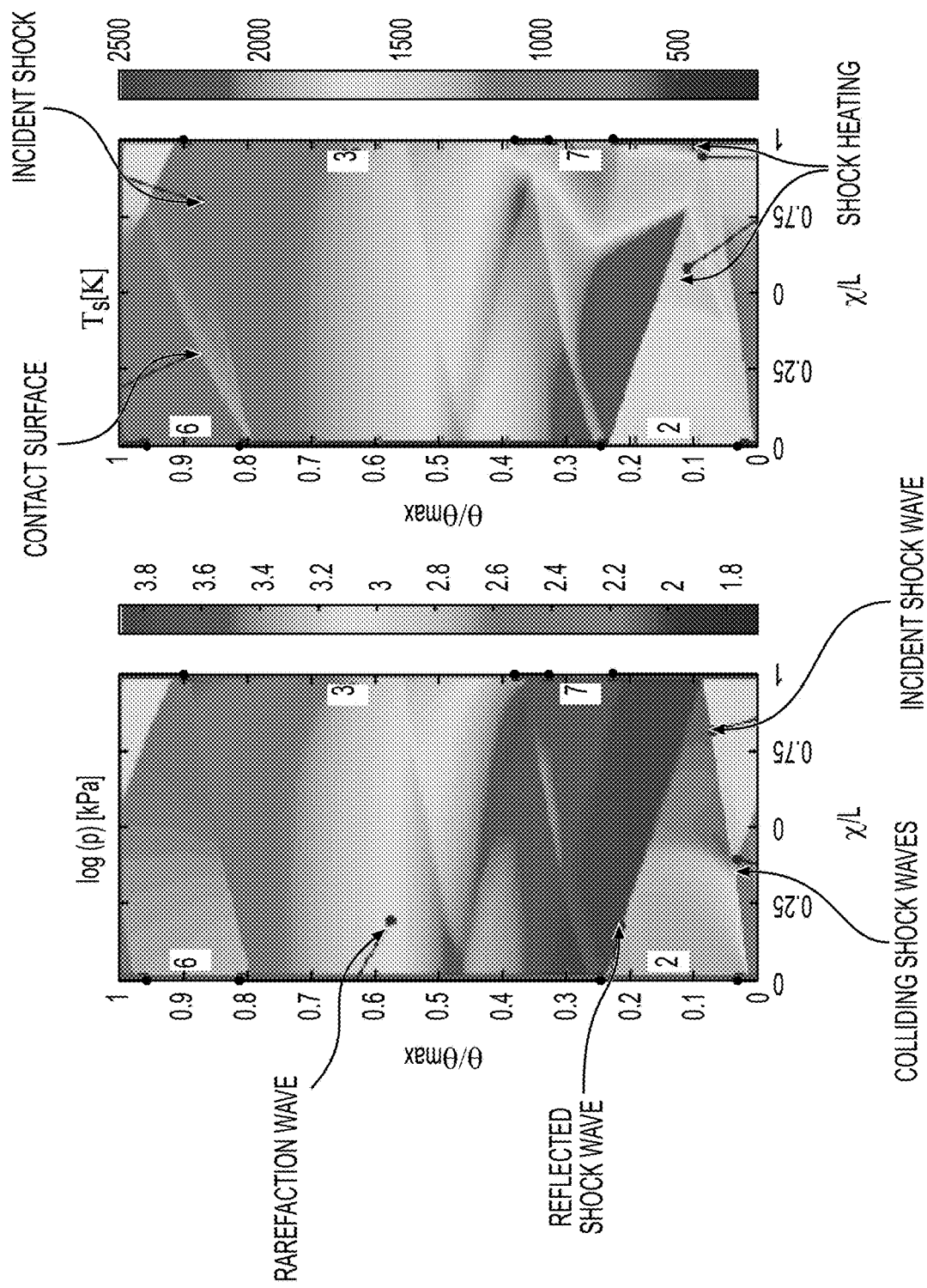
FIGS. 16A-16D show a series of plots showing contours of pressure plotted in logarithmic scale, temperature, Mach number and velocity in a four-port through-flow wave reformer.
Figures 16C, 16D:
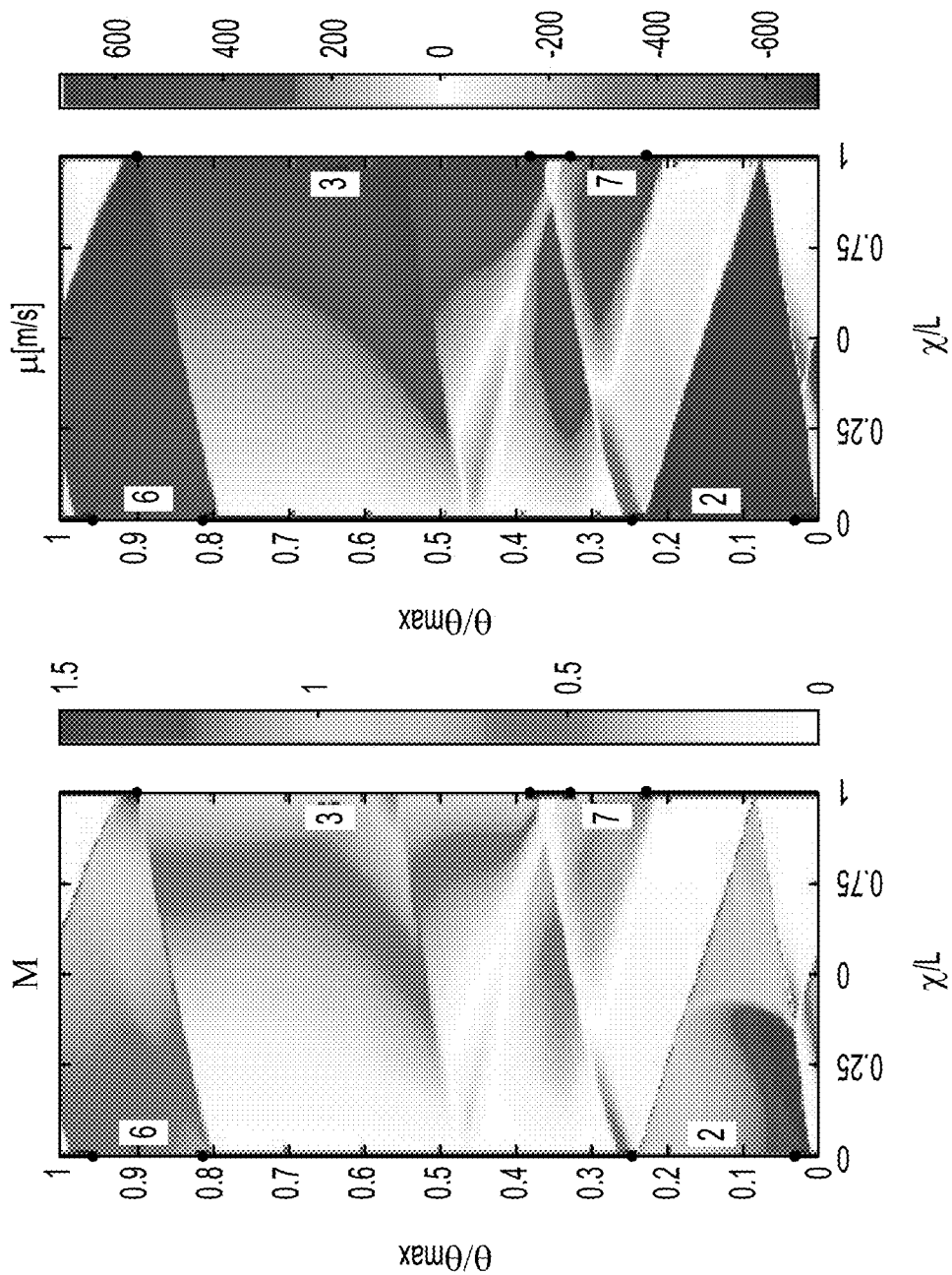

The high-pressure process generated by the shock wave system between ports 2 and 7 is then gradually expanded by the low-pressure port 3. A sufficiently long port width ensures the pressure within the channel can decrease in time for the low-pressure inlet at port 6 to inject the driven gas into the channel. In general, the greater the residual pressure within the channel, the greater the required inlet pressure for the driven gas to reach a desired penetration length becomes. In the shown example, the ammonia driven gas reaches approximately x/L=0.75 into the channel From the temperature FIG. 16B and Mach number FIG. 16C plots, a discernable contact surface and a (weak) shock wave are visible.

To examine the effect of the driven gas inlet pressure, the mass flow split between driver and driven inlet mass flow rates is defined as:

$$\lambda = \frac{\dot{m}_2}{\dot{m}_6}$$

which can be directly linked to the penetration length into the channel and the required driven inlet pressure. The plots exhibited in FIG. 16A-FIG. 16D and FIG. 17A-FIG. 17C denote the flow field for a value of λ=10. FIGS. 18A-FIG. 18J presents pressure, temperature and species ($NH_3$, $H_2$, and $N_2$) mole fractions for two limiting cases of λ=2.5 and λ=30, respectively.

For fixed driver inlet conditions, a decreasing λ requires an increased driven inlet pressure to match the required mass flow rate. This can be seen in the pressure distribution around the opening of the channel to port 6. In concert with the increased inlet pressure, the driven gas exhibits a greater penetration length into the channel, as indicated by the $NH_3$ species contour. In the shown example the driven gas covers well above 90% of the total channel length by the time port 6 closes for $\lambda=2.5$. This decreases considerably to approximately 50% for $\lambda=30$. As a consequence of the increased channel pressure downstream of port 6, the pressure ratio between port 2 and average channel pressure at $\theta/\theta_{max}=0$ decreases and results in significantly reduced penetration length of the driver gases into the channel Consistent with the previous examples, at $\lambda=10$ and the shock tube tests, the high-temperature driver initiates the conversion to $H_2$ at the contact surface. However, the lower the flow ratio, the more the start of conversion shifts towards the left and the inlet side of the reformer. This has significant consequences for the $H_2$ content in the outlet stream through port 7. As shown, in the mole fraction contours of FIGS. 18C-E and 18H-J, an excessive reduction in the mass flow ratio yields increased blockage to the driver port flow effectively depriving it of the means to direct the driven gas well into the target reaction zone and subsequently out of the reformer through port 7.

Figure 19:
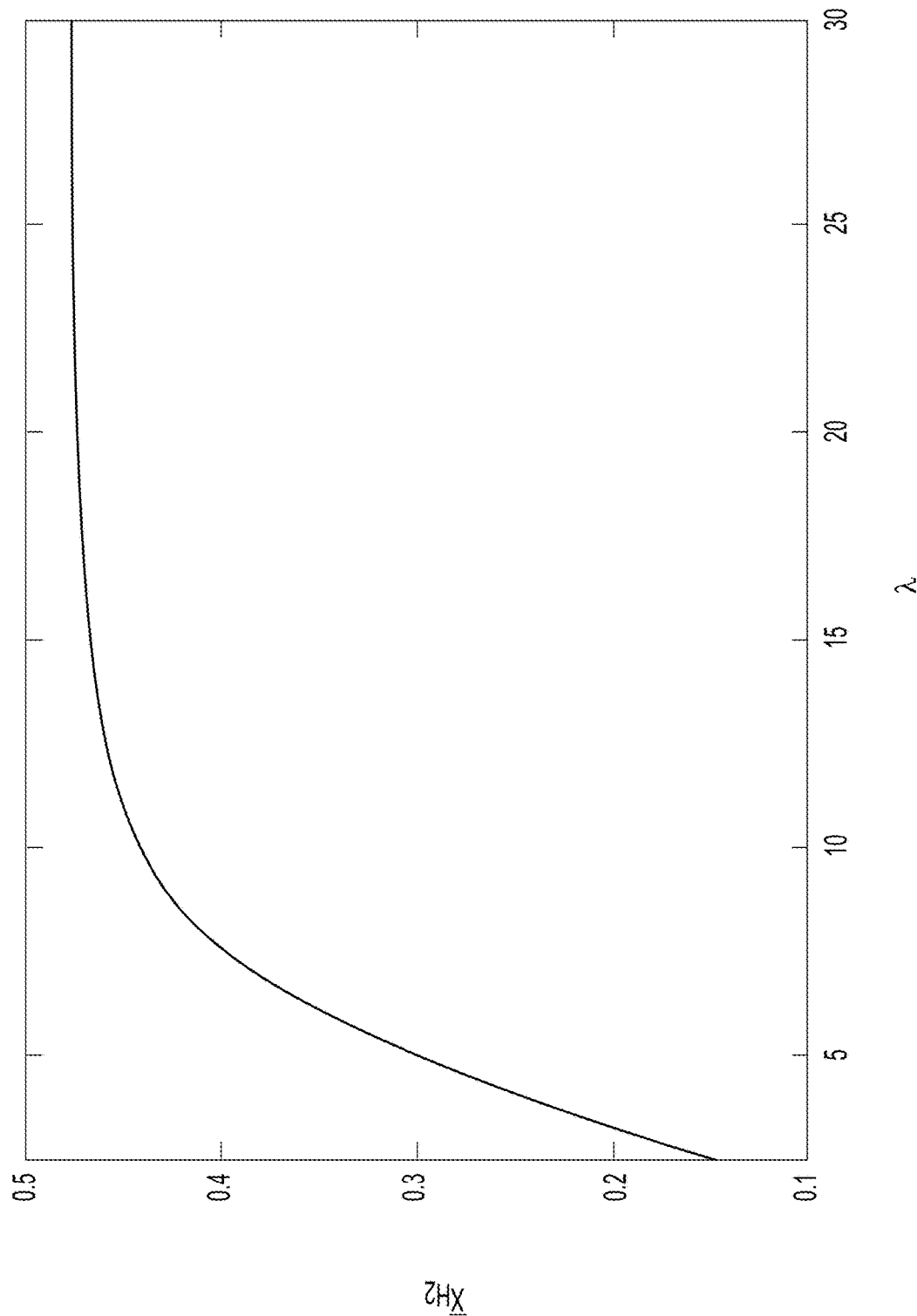
FIG. 19 shows variation of the average mole fraction in the high-pressure outlet stream through port 7 plotted against the inlet mass flow ratio $\lambda$.

This can be summarized by plotting the cycle-averaged mole fraction of $H_2$ through the high-pressure exhaust port 7 against the flow ratio A., as done in FIG. 19. It becomes clear that the $H_2$ content in the stream of port 7 experiences an initially linear increase with flow ratio before reaching a plateau at approximately 47.6%. Since the flow ratio also has an influence on the percentage of post-combustion gas that is bled off to the wave rotor reformer, there may be a trade-off between cycle efficiency and ammonia conversion.

The results of the calculations are shown in Table 1. For each state point at inlets and outlets of the wave reformer, the mass flow rate, static pressure, and static temperature are reported. Consistent with results observed in the wave diagrams, it is seen that by increasing A., intake port pressure reduces ($P_6$). Additionally, a reduction of $NH_3$ penetration length and an increase in the $N_2$ penetration length in the channel characterized by $\dot{m}_6$ and $\dot{m}_2$ variations are seen.

In other designs, the wave reformer 164 shown as a part of the jet engine fuel system 150 shown in FIG. 15 may have more than four ports, depending on the system components and configuration. The number and azimuthal locations of the wave reformer's ports are set to effect fuel reforming quality. For example, six-port and eight-port wave reformers have potentials to provide greater fuel-to-$H_2$ conversion than classic four-port configuration.

When introducing elements of various aspects of the present invention or embodiments thereof, the articles "a," "an," "the" and "said" are intended to mean that there are one or more of the elements, unless stated otherwise. The terms "comprising," "including" and "having," and their derivatives, are intended to be open-ended terms that specify the presence of the stated features, elements, components, groups, and/or steps, but do not exclude the presence of other unstated features, elements, components, groups, and/or steps and mean that there may be additional features, elements, components, groups, and/or steps other than those listed. Moreover, the use of "top" and "bottom," "front" and "rear," "above," and "below" and variations thereof and other terms of orientation are made for convenience but does not require any particular orientation of the components. The terms of degree such as "substantially," "about" and "approximate," and any derivatives, as used herein mean a reasonable amount of deviation of the modified term such that the end result is not significantly changed. For example, these terms can be construed as including a deviation of at least +/−5% of the modified term if this deviation would not negate the meaning of the word it modifies.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. An aircraft fuel generation system supplying a continuous source of fuel for aircraft engines comprising:
    a combustor having a first inlet to receive a high-pressure fluid, a second inlet receiving a high-pressure fuel product, and an output port continuously discharging a flow of a high-pressure burned gas, wherein the high-pressure fuel product is combusted;
    a wave reformer having a first port receiving a flow of pressurized ammonia, a second port continuously discharging the high-pressure fuel product to the second inlet of the combustor, a third port receiving at least a first portion of the flow of the high-pressure burned gas being discharged from the combustor, and a fourth port exhausting a lower pressure burned gas, said wave reformer being configured to cause thermal decomposition of the pressurized ammonia; and
    a power generating turbine including a compressor having a first inlet receiving incoming atmospheric air, a second inlet receiving at least another portion of the flow of the high pressure burned gas discharged from the combustor, and an exhaust outlet producing thrust gas.

2. The power generation system of claim 1 wherein the pressurized ammonia is thermally cracked in the wave reformer by shock waves providing a blend of ammonia-hydrogen as a carbon neutral aviation fuel.

3. The power generation system of claim 1, wherein the wave reformer has either four, five, six, or eight ports.

4. The power generation system of claim 1, wherein the pressurized ammonia received at said first port of the wave reformer has been pre-heated.

5. The power generation system of claim 1, wherein a blend of ammonia-hydrogen gas is produced by the wave reformer as a portion of the high-pressure fuel product.

6. The power generation system of claim 1, wherein the power generating turbine includes an inlet diffuser and an outlet nozzle.

7. The power generation system of claim 1, wherein the high-pressure fuel product comprises a blended ammonia-hydrocarbon fuel, and the wave reformer thermally decomposes the pressurized ammonia to produce the high-pressure fuel product including hydrogen.

8. The power generation system according to claim 1, further comprising a heat exchanger to preheat said pressurized ammonia prior to being input to the wave reformer.

9. The power generation system according to claim 8, wherein said heat exchanger uses hot gases exhausted from the power generating turbine to preheat said pressurized ammonia.

10. The power generation system according to claim 1, wherein said at least another portion of the flow of the high pressure burned gas discharged from the combustor is greater in volume than said at least first portion of the flow of the high-pressure burned gas being discharged from the combustor.

11. The power generation system according to claim 10, wherein a heat exchanger uses a lower pressure gas exhausted from said turbine.

12. A power generation system for operating an aircraft engine comprising:
- a compressor, wherein air is pressurized;
- a source of pressurized and preheated ammonia;
- a combustor having a first inlet to receive a high-pressure air operably connected to said compressor, a second input to receive a high-pressure dual fuel of said pressurized and preheated ammonia and hydrogen, and an outlet for discharging high-pressure burned gas, wherein the dual fuel is combusted;
- a wave reformer having a first port receiving the preheated pressurized ammonia, a second port releasing the high-pressure dual fuel of said pressurized and preheated ammonia and said hydrogen to the second input of the combustor, a third port receiving at least a first portion of the high-pressure burned gas discharged from the combustor, and a fourth port exhausting lower pressure burned gas; and
- a thrust generating turbine device for providing an exhaust thrust for powering an aircraft operatively connected to the outlet of the combustor and receiving at least a second portion of the high-pressure burned gas discharged from the combustor.

13. A method of continuously generating power for aircraft jet engine comprising:
- continuously supplying high-pressure air to a combustor;
- continuously supplying pressurized preheated ammonia to a wave reformer through a first inlet port thereof to allow thermal decomposition of the pressurized preheated ammonia into a high-pressure dual fuel product including said pressurized preheated ammonia and hydrogen;
- continuously injecting the high-pressure dual fuel product including said pressurized preheated ammonia and said hydrogen discharged from the wave reformer to the combustor to allow combustion thereof to occur therein; and
- continuously discharging a high pressure burned gas from the combustor and directing at least a first portion of the high-pressure burned gas to a second port of the wave reformer, and a at least a second portion of the high-pressure burned gas to a turbine to generate operating power for the aircraft jet engine.

14. A method according to claim 13, wherein said pressurized preheated ammonia is preheated by a heat exchanger that uses hot gases exhausted from said turbine.

* * * * *